US009809927B2

(12) United States Patent
Boegli

(10) Patent No.: US 9,809,927 B2
(45) Date of Patent: Nov. 7, 2017

(54) DEVICE FOR EMBOSSING AND/OR PERFORATING FOILS FOR TOBACCO GOODS

(71) Applicant: BOEGLI-GRAVURES S.A., Marin-Epagnier (CH)

(72) Inventor: Charles Boegli, Marin-Epagnier (CH)

(73) Assignee: Seiko Epson Corporation, Tokyo (JP)

( * ) Notice: Subject to any disclaimer, the term of this patent is extended or adjusted under 35 U.S.C. 154(b) by 224 days.

(21) Appl. No.: 14/405,361

(22) PCT Filed: Jun. 6, 2013

(86) PCT No.: PCT/IB2013/054656
§ 371 (c)(1),
(2) Date: Dec. 3, 2014

(87) PCT Pub. No.: WO2013/183022
PCT Pub. Date: Dec. 12, 2013

(65) Prior Publication Data

US 2015/0114585 A1 Apr. 30, 2015

(30) Foreign Application Priority Data

Jun. 8, 2012 (EP) .................................... 12171255

(51) Int. Cl.
*B31F 1/07* (2006.01)
*B23K 26/00* (2014.01)
(Continued)

(52) U.S. Cl.
CPC .............. *D21F 3/086* (2013.01); *A24C 5/005* (2013.01); *A24C 5/007* (2013.01); *B31F 1/07* (2013.01);
(Continued)

(58) Field of Classification Search
CPC . A24C 5/005; A24C 5/007; B31F 1/07; B31F 2201/0733; B31F 2201/0741;
(Continued)

(56) References Cited

U.S. PATENT DOCUMENTS 2,924,223 A * 2/1960 Miller .................... A24C 5/007 131/284
3,596,663 A 8/1971 Schultz et al.
(Continued)

FOREIGN PATENT DOCUMENTS

DE 43 02 508 A1 8/1993
EP 0 536 407 4/1993
(Continued)

OTHER PUBLICATIONS

International Search Report issued in PCT/IB2013/054656 dated Jan. 10, 2014.

*Primary Examiner* — Matthew G Marini
*Assistant Examiner* — Marissa Ferguson Samreth
(74) *Attorney, Agent, or Firm* — Foley & Lardner LLP

(57) ABSTRACT

The device for embossing and perforating foils for tobacco goods includes: a pair of embossing rolls, one of the embossing rolls having teeth for perforating the foil, the counter roll to the embossing roll with the perforating teeth being a matrix roll which has recesses that correspond to the teeth on the patrix roll, both embossing rolls being arranged in a perforation device, and the device being designed in order to be operated directly or indirectly online in a machine for producing tobacco goods. The use of patrix-matrix embossing rolls allows for a large variety of perforations, the device having a control unit designed to control the exact position, size and arrangement of the perforations on the basis of the quality of the foil to be processed.

16 Claims, 17 Drawing Sheets

(51) Int. Cl.
*D21F 3/08* (2006.01)
*A24C 5/00* (2006.01)
*D21F 3/04* (2006.01)

(52) U.S. Cl.
CPC .......... *D21F 3/04* (2013.01); *B31F 2201/072* (2013.01); *B31F 2201/0743* (2013.01); *B31F 2201/0779* (2013.01); *B31F 2201/0797* (2013.01)

(58) Field of Classification Search
CPC ........ B31F 2201/072; B31F 2201/0743; B31F 2201/0779; B31F 2201/0797; B23K 26/362; B44B 5/026; D21F 3/04; D21F 3/086
See application file for complete search history.

(56) References Cited

U.S. PATENT DOCUMENTS

| | | | | | |
|---|---|---|---|---|---|
| 4,390,032 | A | | 6/1983 | Labbe et al. | |
| 5,009,093 | A | * | 4/1991 | Quinn, Jr. | B21D 53/262 72/177 |
| 5,246,656 | A | * | 9/1993 | Stephenson | A61F 7/0097 264/153 |
| 5,839,688 | A | * | 11/1998 | Hertel | B65H 18/10 226/28 |
| 6,665,998 | B1 | | 12/2003 | Boegli | |
| 6,928,929 | B1 | * | 8/2005 | McNeil | B26D 5/32 101/226 |
| 2008/0264280 | A1 | * | 10/2008 | Baggot | B41F 13/12 101/248 |
| 2010/0163194 | A1 | * | 7/2010 | Sauter | B31F 1/07 162/114 |
| 2011/0030569 | A1 | * | 2/2011 | Boudreau | B41F 9/003 101/216 |
| 2011/0311749 | A1 | * | 12/2011 | McNeil | A47K 10/16 428/43 |
| 2013/0093117 | A1 | * | 4/2013 | Griesmayr | B29C 59/04 264/293 |

FOREIGN PATENT DOCUMENTS

| | | | | | |
|---|---|---|---|---|---|
| EP | 2 327 502 | A | | 6/2011 | |
| GB | 2 133 269 | | | 7/1984 | |
| GB | 2 264 038 | | | 8/1993 | |
| WO | WO-00/33675 | | | 6/2000 | |
| WO | WO-2011/042353 | | | 4/2011 | |
| WO | WO-2011/131529 | | | 10/2011 | |
| WO | 2011/161002 | | * | 12/2011 | B31F 1/07 |

* cited by examiner

*Fig. 1*
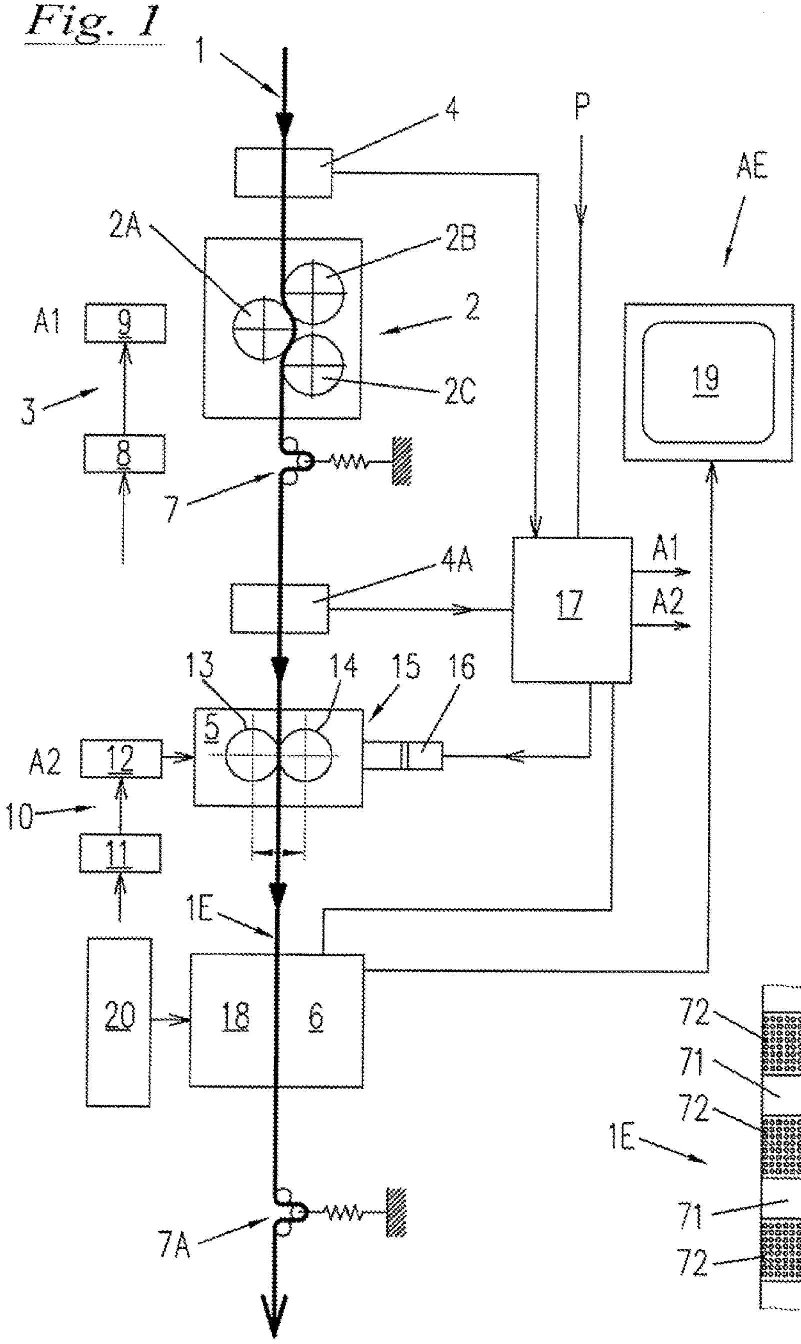
*Fig. 1A*
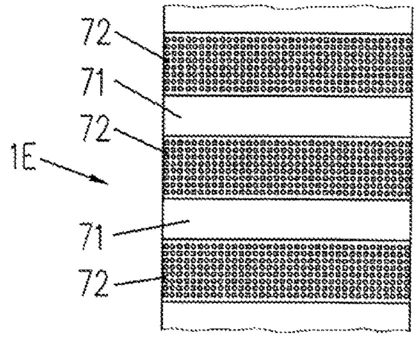
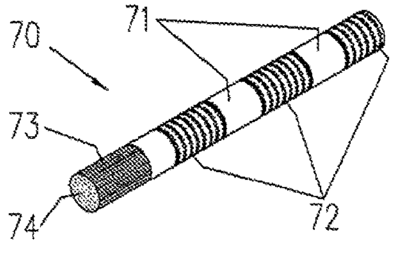
*Fig. 1B*

DEVICE FOR EMBOSSING AND/OR PERFORATING FOILS FOR TOBACCO GOODS

This application is a national stage entry of International Application No. PCT/IB2013/054656 filed Jun. 6, 2013, which claims priority to European Patent Application No. 12171255.8, filed Jun. 8, 2012, the disclosures of both of which are hereby incorporated by reference in their entirety.

The present invention relates to a device for embossing and/or perforating foils for tobacco goods, comprising a pair of embossing rolls, one of the embossing rolls having teeth for perforating the foil. Here, the term "foil" covers a foil encasing a cigarette, for example made of paper, which is possibly pre-printed or pre-embossed and can have so-called LIP (Low Ignition Propensity) zones or stripes or is entirely provided with a fire-retardant substance, and also the mouthpiece paper, the so-called tipping paper, which is wound around the cigarette filter.

BACKGROUND

Embossing devices from the prior art having rolls are predominantly used for embossing packaging foils, for example for the foodstuffs industry, the pharmaceutical industry and in particular for the tobacco goods industry. In the tobacco goods industry, devices having embossing rolls have been used for more than 30 years for embossing packaging foils, in particular so-called innerliners, these innerliners not only being provided with decorative effects but also with authentication features. Here, the paper component is stabilized in such a way that the foil can be processed without inconvenience in the following packaging plant.

However, in the tobacco goods industry, it is not just packaging foils that are processed or embossed but also the paper and the mouthpiece, also called tipping, for encasing the individual cigarette. During the processing of cigarette paper and of the mouthpiece, in addition to the decorative effect, endeavors are primarily made to make perforations deliberately in the cigarette paper and in the mouthpiece, in order to increase the throughput of air during smoking.

As opposed to the increased throughput of air of a cigarette during drawing, in various states, including in the EU, statutory regulations have been granted or are being prepared to the effect that the cigarettes, when not being smoked, will extinguish themselves after a specific time interval. This is achieved by means of a fire-retardant substance which initially was applied in the LIP zones and which, for example, can consist of a coating in the interior of the cigarette paper, in order to reduce the porosity. In recent times, it has transpired that this zonal coating is too complicated for mass production and the trend to providing the entire cigarette paper with the fire-retardant substance before the processing has therefore become widespread. The result of this is that perforations become necessary in order to achieve the necessary throughput of air. However, the perforations cannot extend randomly over the length of the cigarette but must be arranged at specific points.

Most of the devices known at present for producing perforations in cigarette paper are implemented by means of a laser system since, in principle, the quantity and size of holes can be set well thereby. Such laser systems for producing relatively large holes are very complicated, however, and cannot be used online in a cigarette production machine.

Within the content of the present invention, the term tobacco goods production machine is understood to mean equipment for encasing individual tobacco goods items such as cigarettes, this machine being designated a "maker" in this application. Here, the embossed foil can be fed to the maker directly or indirectly by a robot. Both methods are designated online methods. From there, the cigarettes pass to a tobacco goods packaging machine, also called a "packer" for short, in which a number of cigarettes are packed. In the present application, only the maker following the perforation is of interest.

In the case in which porous cigarette paper is used to increase the draw during smoking, the area in which the cigarette paper is porous can be embossed in such a way that the cigarette paper becomes corrugated at this point, so that when this cigarette paper is encased with the mouthpiece paper, additional air-conducting areas are produced, which increase the quantity of air during drawing. Examples of such perforation systems are disclosed in U.S. Pat. No. 3,596,663, EP 0 536 407 A1 and GB 2 133 269 A.

It is also known, for example from WO 2011/131529 A1, to apply perforations by means of embossing rolls, it being possible for the perforations to be applied only at specific points, for example outside the LIP zones which effect the extinguishing of the cigarette after a certain time. In this WO application, it is primarily emphasized that the film must not be weakened by the perforations in such a way that, during the further processing, tearing of the same can be caused. For the perforations, the teeth, which have been known per se for a long time, are used in a pin-up pattern, the teeth being disclosed as pyramidal. The WO application likewise discloses a monitoring unit which examines the foil following the embossing, in order to determine various properties of the embossed foil and, with regard to the tearing resistance, in order to control the mutual pressure of the embossing rolls and therefore the penetration depth of the teeth into the paper.

SUMMARY

On the basis of this known prior art, it is an object of the invention to specify a device for embossing and/or perforating foils for tobacco goods with which it is possible to perforate these foils for further processing in a tobacco goods production machine accurately online at specific points, it being possible for the perforations also to serve as a decoration, and predefined standards with regard to the drawing and extinguishing quality of the cigarette being satisfied.

BRIEF DESCRIPTION OF THE DRAWINGS

The invention will be explained in more detail below by using drawings of exemplary embodiments.

FIG. 1 shows a flow chart of an embossing device for cigarette paper in the online operation;

FIG. 1A shows a processed foil with LIP and perforation zones;

FIG. 1B shows an encased cigarette with LIP and perforation zones;

DETAILED DESCRIPTION

Figure 2:
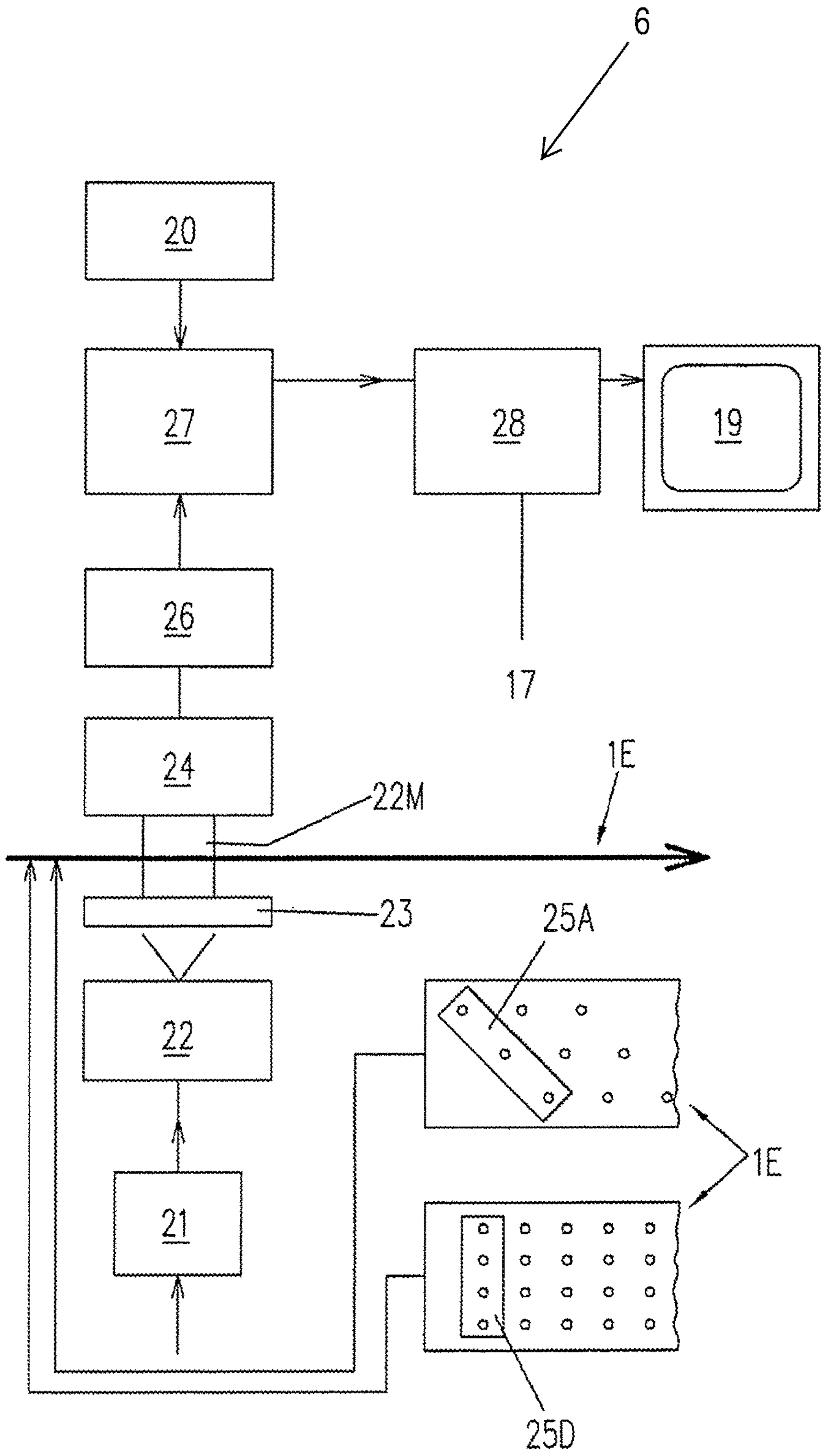
FIG. 2 shows in detail the quality checker from the flowchart of FIG. 1.

FIG. 1 shows a possible flowchart for the embossing and perforating of cigarette casing foils, at present predominantly made of paper or so-called tipping foils, called "foil" for short below.

If the foil already has LIP zones applied, any embossing or printing patterns and the hole patterns must be applied as a local function of said LIP zones. However, in addition if the entire foil has already been treated entirely with a fire-retardant substance, any embossing or printing patterns and the hole patterns must be produced at specific points. Here, suitable markings, so-called "eyes marks" can already be present for this purpose or can be applied continuously. These zones, printing patterns or other markings are detected by a position sensor. The various markings, patterns and zones on the foil, possibly having to be taken into account, are combined by the term "character".

According to FIG. 1, the foil 1 to be processed firstly runs through a first position sensor 4, then, if appropriate, an embossing unit 2, known per se, having three embossing rolls 2A, 2B and 2C here, then a control unit 3 for detecting the relative position of the operating cycle A1 of the embossing unit 2 in relation to the processing cycle P of the maker. The foil then runs through a first buffer unit 7, a second position sensor 4A for detecting embossing and printing structures, a perforating apparatus 5 and then a quality checker 6 for detecting the perforated pattern and having a printing control sensor 18, in order then, via a second buffer unit 7A, to reach the maker, not shown, either directly or via a robot. A printer, the control system of which is formed in an analogous way to the control system of the embossed unit, can be connected before, after or instead of the embossing unit 2.

If the embossing unit 2 is used, the processing cycle P can be defined, for example, by a length section of the foil 1 to be fed in per unit time of the maker, to which length section the operating cycle A1 of the embossing unit 2 must be matched during the pre-treatment of the foil 1. A positionally accurate arrangement of the surface structure impressed by the embossing unit on the length section of the foil to be supplied in each case corresponds thereto. The surface structures can be, for example, one or more logos, which are produced by removing or changing teeth on a roll or multiple rolls. It can also be a printed pattern. The embossing unit 2 can also contain a male-female embossing roll pair.

The control unit 3 contains a determining apparatus 8, it being possible for the latter, for example, to include continuous optical detection of the position of the surface structure which has been impressed on the film 1 in the embossing unit 2. The detection is carried out on the transport path between the embossing unit 2 and the perforation apparatus 5. The operating cycle A1 determined is matched to the processing cycle P in a positioning apparatus 9. A manual and/or automated adaptation method is conceivable for this purpose. For instance, the embossing roll of embossing unit 2 can be uncoupled temporarily from the drive in order in this way to lengthen the transport path of the foil 1 by a desired extent, which is then in harmony with the processing cycle P. The requisite lengthening of the transport path of the foil is absorbed by a buffer unit 7, which is arranged after the embossing unit 2.

For the purpose of defining and monitoring the operating cycle A2 of the perforation apparatus 5, the device additionally comprises a control unit 10. The latter contains a comparison apparatus 11, by means of which detection of a quantitative deviation between the operating cycles A1 and A2 of the embossing unit and of the perforation apparatus is made possible. This can be carried out, for example, continuously optically by means of a lamp, which is formed in the manner of a stroboscope for regularly chronologically spaced emissions of light onto the foil. The emission frequency preferably corresponds to the processing cycle P. In this way, optical detection of the relative position between the patterns applied in the embossing unit 2 and the perforation structures molded in the perforation unit 5 on the foil 1 and 1E, respectively, is carried out.

In addition to the optical synchronization, other means are also conceivable, for example visual detection or manual adjustment of the positioning apparatus, by means of which the operating cycle A1 of the control unit 3 is synchronized with the operating cycle A2 of the control unit 10. Instead of optical synchronization signals, electronic synchronization signals or else mechanical synchronization means can be used, such as, for example, a plurality of gear wheels and/or belts, which can be equipped with an angle and/or position adjusting mechanism.

Instead of synchronizing the control unit 10 via the control unit 3, the converse procedure of adapting the operating cycle of the embossing unit 2 controlled by the control unit 3 by the control unit 10 is also conceivable, in order as a result to achieve uniform incorporation in the processing cycle P. In both types of synchronization, two-stage synchronization is carried out in series, in order to detect the possible deviations of the operating cycle of both embossing units both from the processing cycle P and from one another, by which means more precise equalization is achieved.

The information determined in such a way is used further in a positioning apparatus 12 in order to match the operating cycle A2 to the operating cycle A1 in such a way that the perforation patterns 25A-25D formed have the desired relative position on the foil 1E. For instance, the positioning apparatus 12 can be designed for the manual and/or automated adjustment of the initial relative position of the driven perforation roll 13 with respect to the foil 1. For this purpose, the markings 40 on the embossing rolls can be used. To this end, a clutch for uncoupling the perforation roll 13 from the roll drive 50 is conceivable. This additionally permits a necessary or process-dependent change in the relative position of the perforation patterns 25A-25D (shown in FIGS. 20A-20D) on the foil 1E.

Furthermore, the comparison apparatus 11 can also be used to detect the relative deviation of the operating cycle A2 from the processing cycle P, for once more checking the synchronization with the subsequent encasing process. Furthermore, in this way indirect conclusions can also be obtained about an unintended deviation of the operating cycle A2 with respect to the operating cycle A1, since the operating cycle A1 has already been synchronized with the processing cycle P by means of the control unit 3. The second buffer unit 7A is provided to change the transport path of the film 1 as required during an intervention of the positioning apparatus 12 after the perforation unit 5.

As will be explained more extensively further below, both the spacing of the two perforation rolls 13 and 14 of perforating unit 15 and also the pressure of one roll on the other roll are controlled in order to produce the desired perforation patterns. The pressure transducer 16 suitable for this purpose is controlled via a control unit 17. The schematic drawing of FIG. 1 reveals that the processing cycle P and a signal from one or both of the sensors 4, 4A are applied to the control unit 17 in order to control the pressure transducer 16.

In a simplified device, it is possible to arrange for the embossed foil 1E after the perforation apparatus to reach the maker but it is advantageous and imperative for many applications to monitor the hole pattern following the processing by the perforation rolls and possibly to intervene in the control loop. For this purpose, after the pair of perforating rolls and before the second buffer unit 7A there is arranged a quality checker 6 with printing control sensor 18.

The quality checker unit 6 is connected to the control unit 17 in order to control the pair of perforating rolls via the pressure transducer 16. In addition, this unit 6 is connected to an computer unit 19 of evaluation device AE. A template 20, which is present in electronic form here, also belongs to the quality checker unit 6.

FIG. 1A illustrates a foil 1E having perforation zones 72, which leave LIP areas free between and beside themselves. Here, "LIP" denotes "low ignition propensity", fire-retardant material being applied to the side of the foil to be located on the inside. These can also be LIP zones which have been applied before the embossing. Before the perforation of tipping paper, there are no LIP areas but possibly embossed or printed zones.

FIG. 1B illustrates a cigarette 70 encased with a foil 1E, on which the perforation zones 72 and the LIP areas 71 lying therebetween and the mouthpiece 73 and the filter 74 can be seen.

The quality checker 6 is explained in detail in FIG. 2. At the bottom right, it is possible to see two of the possible hole patterns of the foil 1E, the patterns 25A and 25D. A signal from the control unit 17 passes to a laser flashgun 21 and from there to imaging optics 22 and to a measuring mask 23. The measuring beam 22M shines through the foil and there reaches the pattern 25A or 25D of the embossed foil 1E, the image of which reaches a high-speed image sensor 24 and there reaches a memory 26, where it is stored. The correlation detector 27 obtains the image of the hole pattern 25A or 25D and also the corresponding pattern from the template 20, from where it passes to an evaluation unit 28 with evaluation algorithm, which additionally comprises a computer unit 19. From there, the result is transmitted to computer unit 19. The evaluation unit 28 is connected to the control unit 17.

The template 20 serves both as a template for the production of the perforation elements on the perforating rolls and for monitoring the embossed hole pattern on the foil. As a result, a reliable and easily checked authentication of the cigarettes or other smoking goods encased by such foils can be performed.

By using the process control described above, it is possible to position both the LIP zones and the decorative pattern accurately on the foil, in order to be able to produce the rows of holes at the desired points. The control unit 17 is equipped to intervene in a controlling manner in the process if the various zones change, wherein various parameters can exert an influence thereon.

In FIGS. 3 to 16, various forms of the male embossing roll 13 and the female embossing roll 14 are illustrated. Here, in each case one of the rolls is driven by a belt drive 29, and this drive is transmitted to the other roll via the gear wheels 30 and 31. Both the belt drive 29 and gear wheels 30, 31 can be replaced by suitable electronic means. The male embossing roll 13A has pyramidal teeth 33 with a square outline, the schematically shown teeth here being arranged in respectively three rows. The distance D of the rows from one another depends on the desired permeability which, amongst other things, depends on the number and size of the holes.

In order to obtain a better embossing quality, which, amongst other things, depends on the fluctuating paper thickness, it is expedient to provide the area of the rolls with a smaller diameter where the embossing elements are arranged. The length L of this zone 32 is somewhat greater than the width of the foil 1. The reduction S1 can be arranged on one or both embossing rolls, the total reduction then being the same.

The female embossing roll 14A has depressions 34 assigned to the perforating teeth 33 on the male embossing roll 13A. The depressions 34 are not necessarily inversely congruent with the teeth 33 and can have shapes and geometric dimensions differing from the teeth, as will emerge from the description of FIG. 17.

Figure 3:
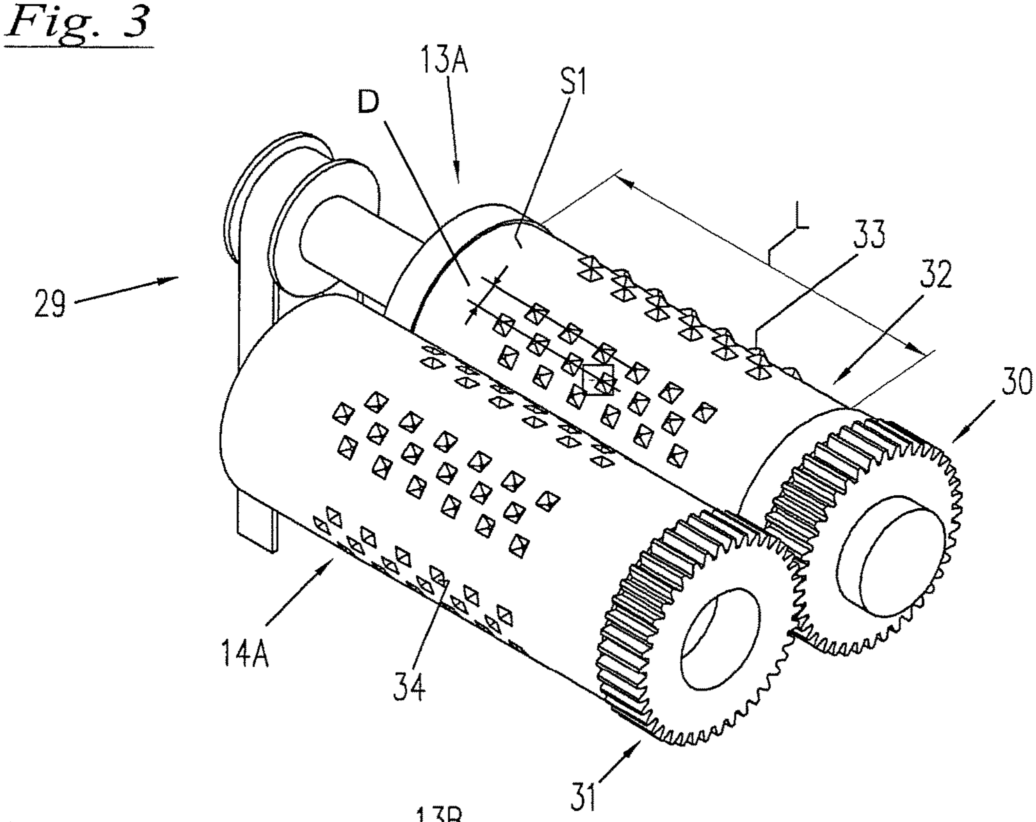
FIGS. 3-16 show various embossing roll pairs in male-female embossing roll arrangements.
Figure 4:
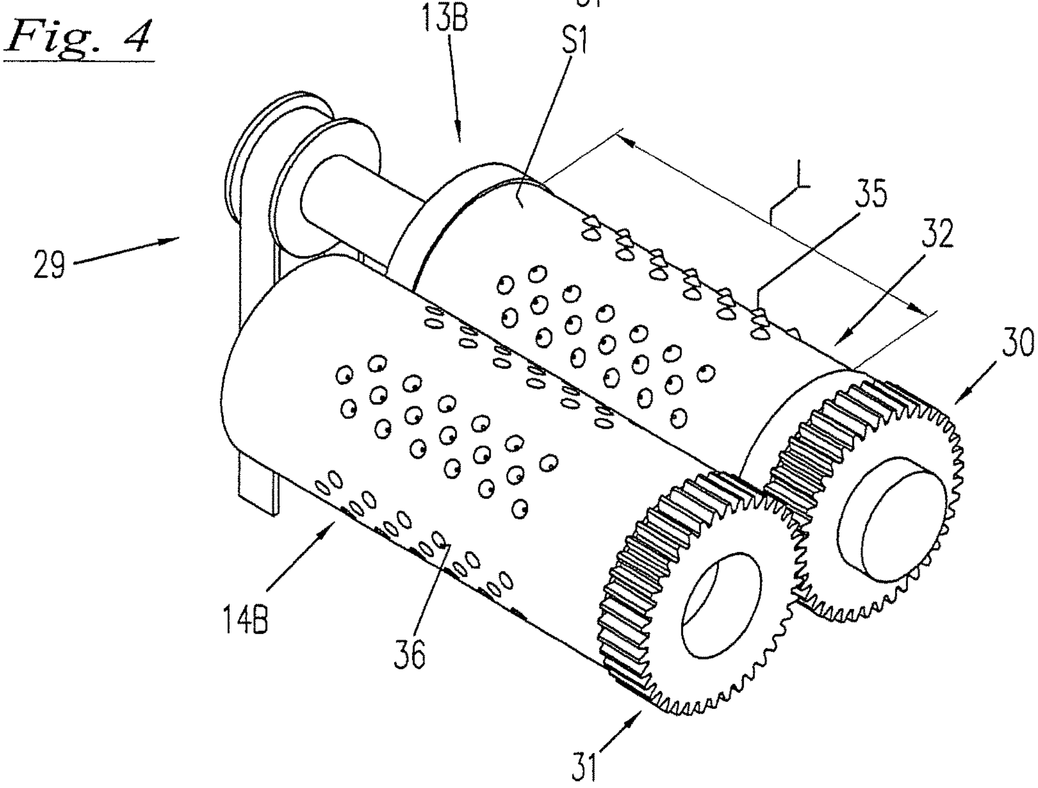

The male embossing roll 13B in FIG. 4 has conical teeth 35, while the female embossing roll 14B has depressions 36 assigned thereto. The remaining configuration of this pair of rolls is the same as the pair of rolls from FIG. 3.

Figure 5:
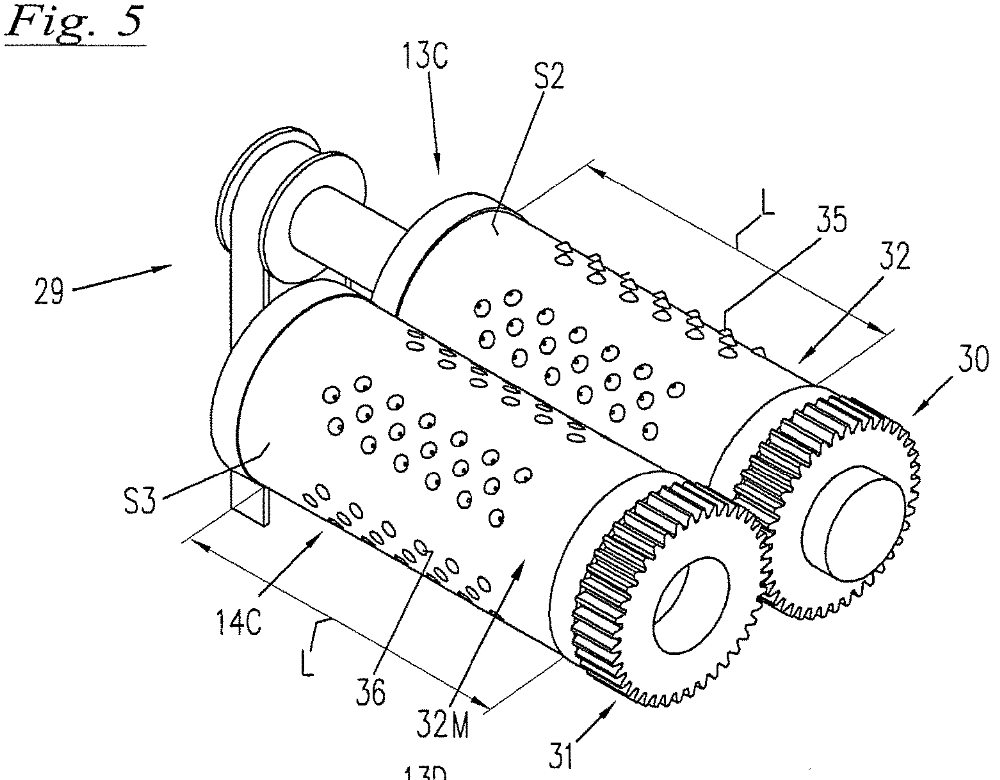

The pair of rolls 13C and 14C according to FIG. 5 have the same conical teeth and depressions 35 and 36 as according to FIG. 4, the difference consisting in the fact that the two rolls each have a reduced zone 32 and 32M, the reductions S2 and S3 not having to be the same as in the preceding examples.

Figure 6:
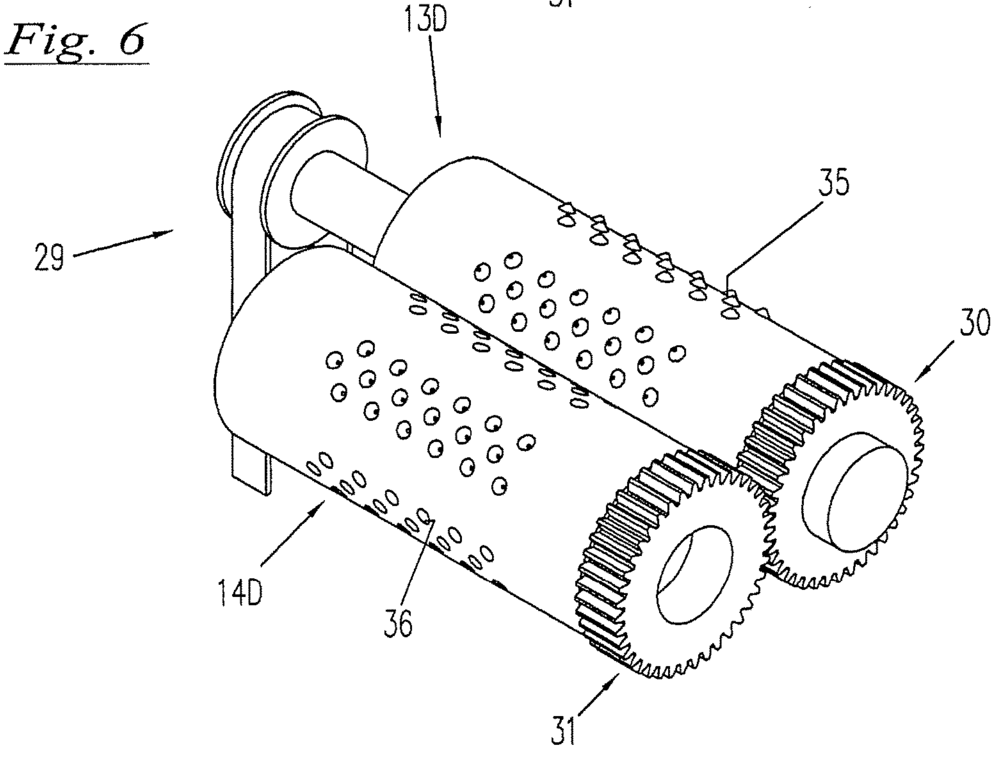

In the design variant of FIG. 6, the rolls 13D and 14D have no reduction.

Figure 7:
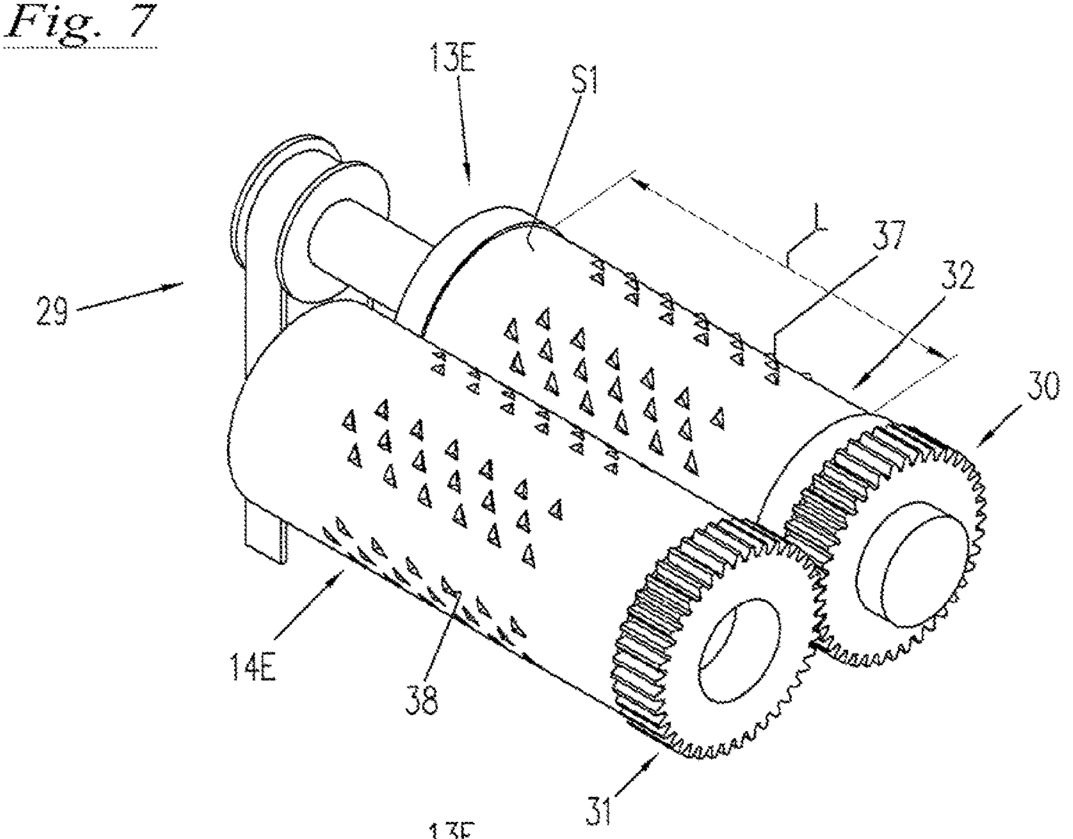

The pair of rolls 13E and 14E from FIG. 7 have teeth and depressions 37 and 38 which are pyramidally shaped and have a triangular outline. The male embossing roll 13E has a reduction S1.

Figure 8:
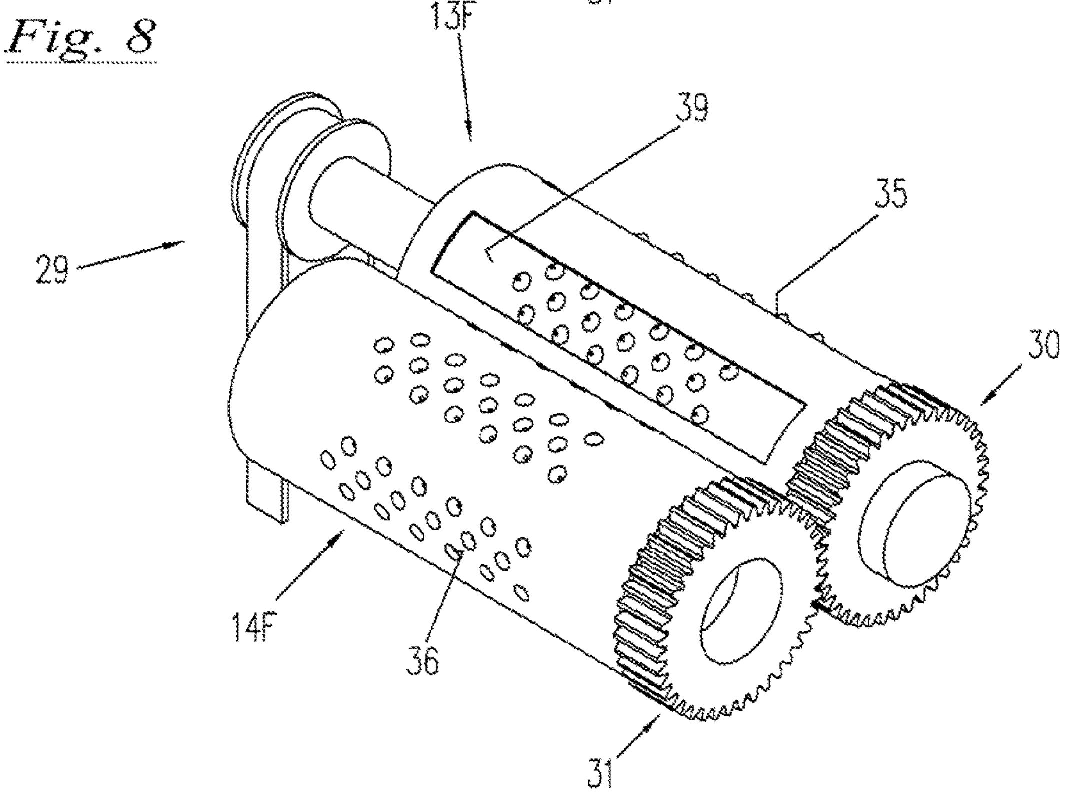

The pair of rolls 13F and 14F from FIG. 8 have conically tapering teeth and depressions 35 and 36, none of the rolls having a reduction. However, as a design variant, the points 39 at which the teeth are arranged in the male embossing roll 13F are elevated. Here, this elevation corresponds approximately to the thickness of the foil. The remaining parts of the pair of rolls are configured in a similar way to the pair of rolls 13B and 14B.

Figure 9:
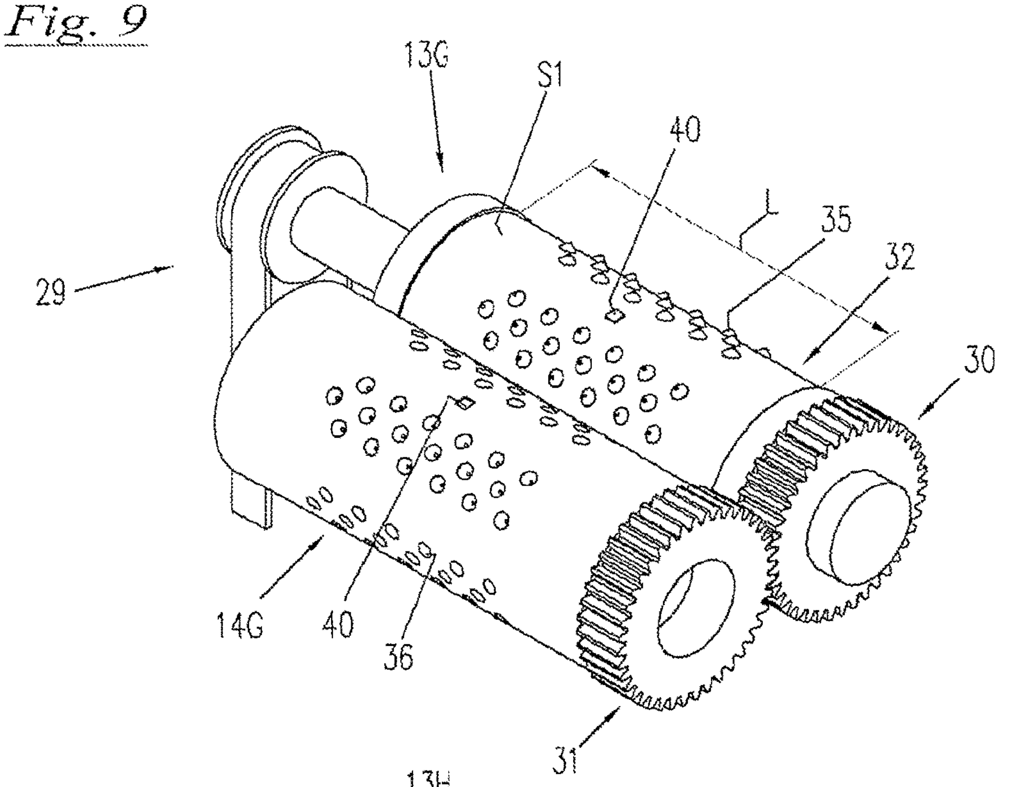

The pair of rolls 13G and 14G according to FIG. 9 are the same as the pair of rolls according to FIG. 4, with the exception of the position marking 40 on both rolls, in order to be able to synchronize the rolls with the processing cycle P and the operating cycles.

Figure 10:
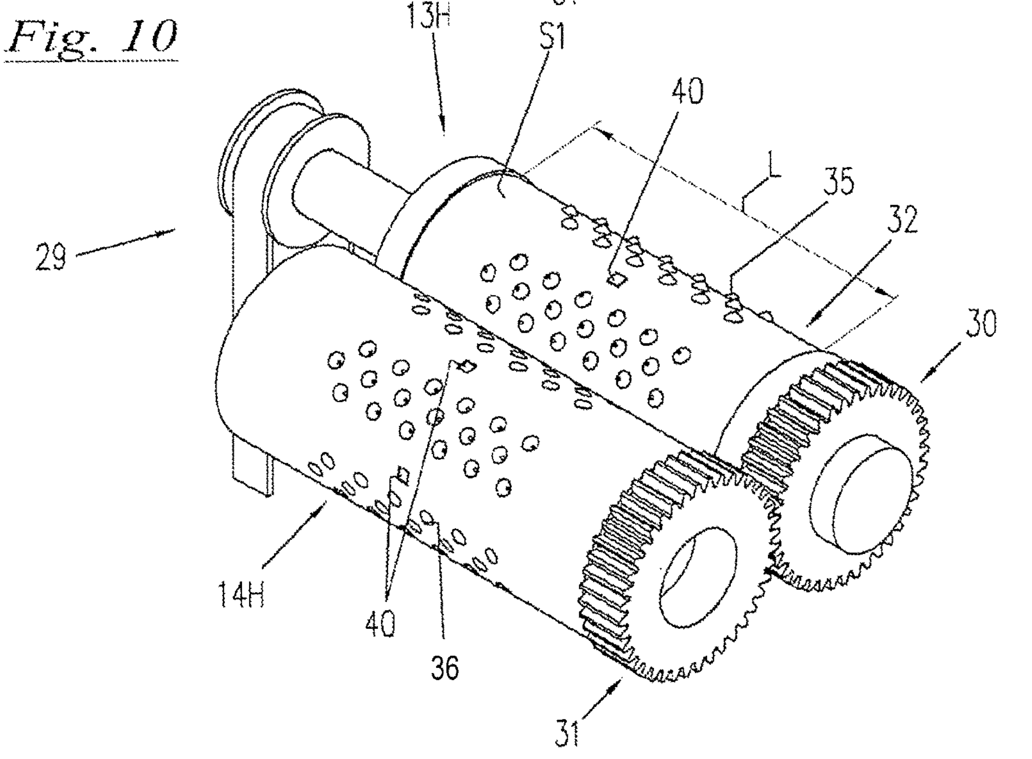

The difference between the pair of rolls 13G and 14G according to FIG. 9 and 13H and 14H according to FIG. 10 consists in the fact that the position marking 40 in the pair of rolls according to FIG. 10 is applied after each section of rows of teeth.

Figure 11:
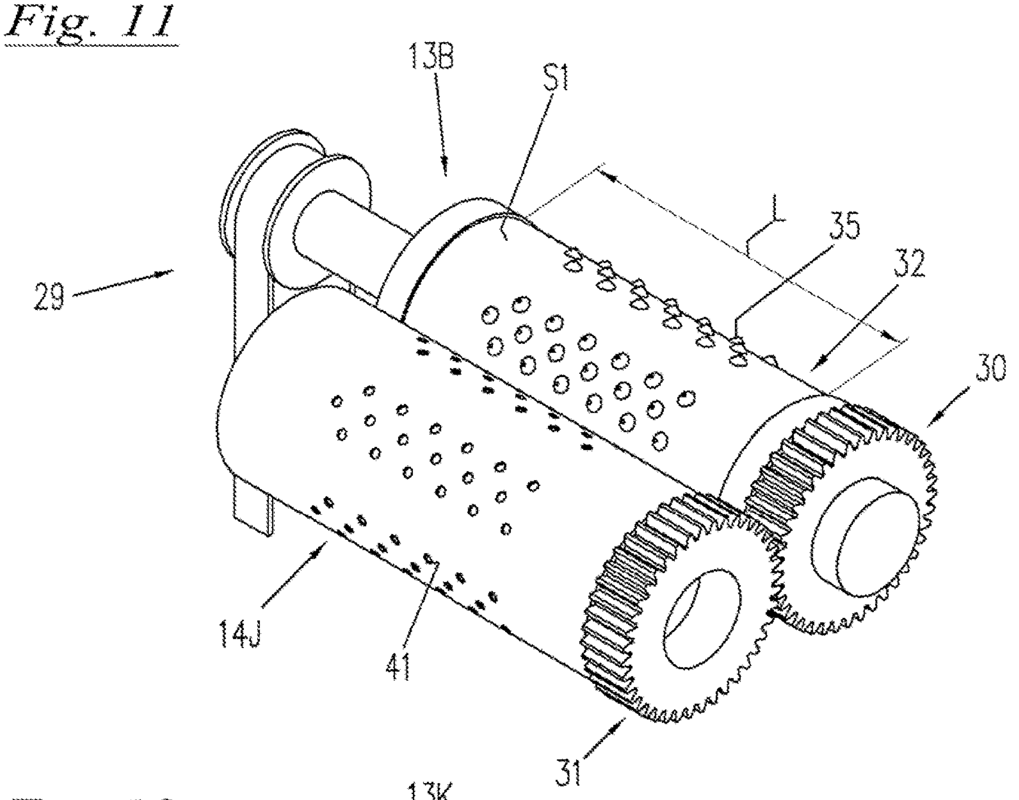

In the pair of toothed rolls according to FIG. 11, the male embossing roll 13B is the same as that according to FIG. 4, while the female embossing roll 14J has depressions 41 assigned to the teeth 35 which are less deep than the associated teeth 35.

Figure 12:
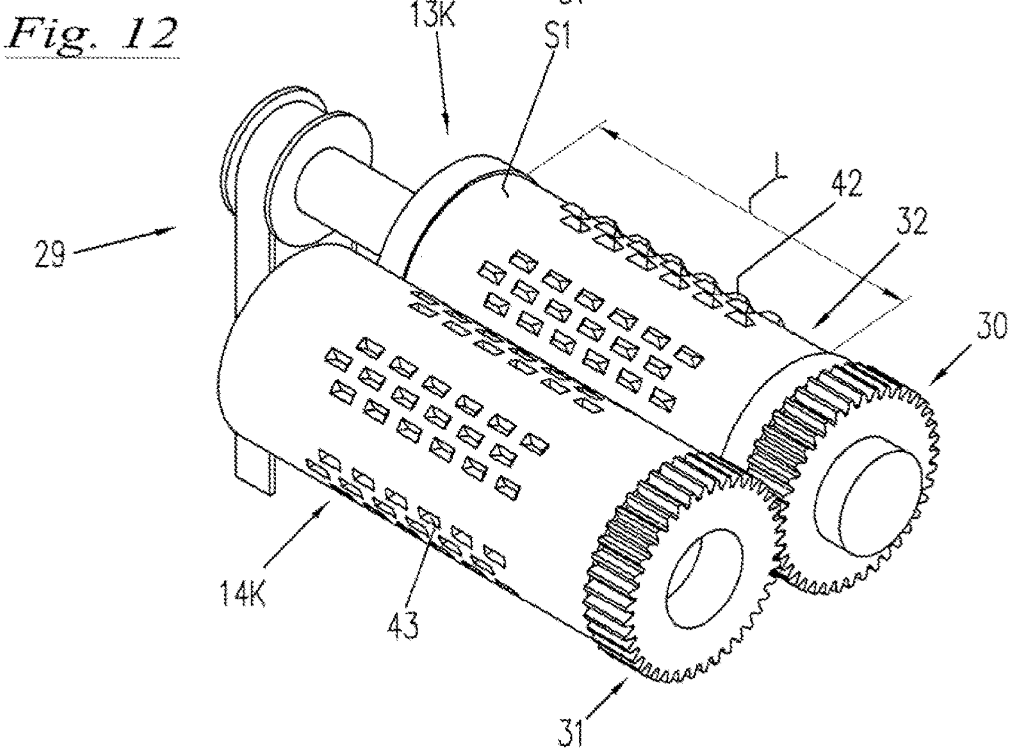

The pair of rolls 13K and 14K according to FIG. 12 differ from those according to FIG. 3 in that the teeth 42 have a rectangular and not a square outline. Accordingly, the outline of the associated depressions 43 is likewise rectangular.

Figure 13:
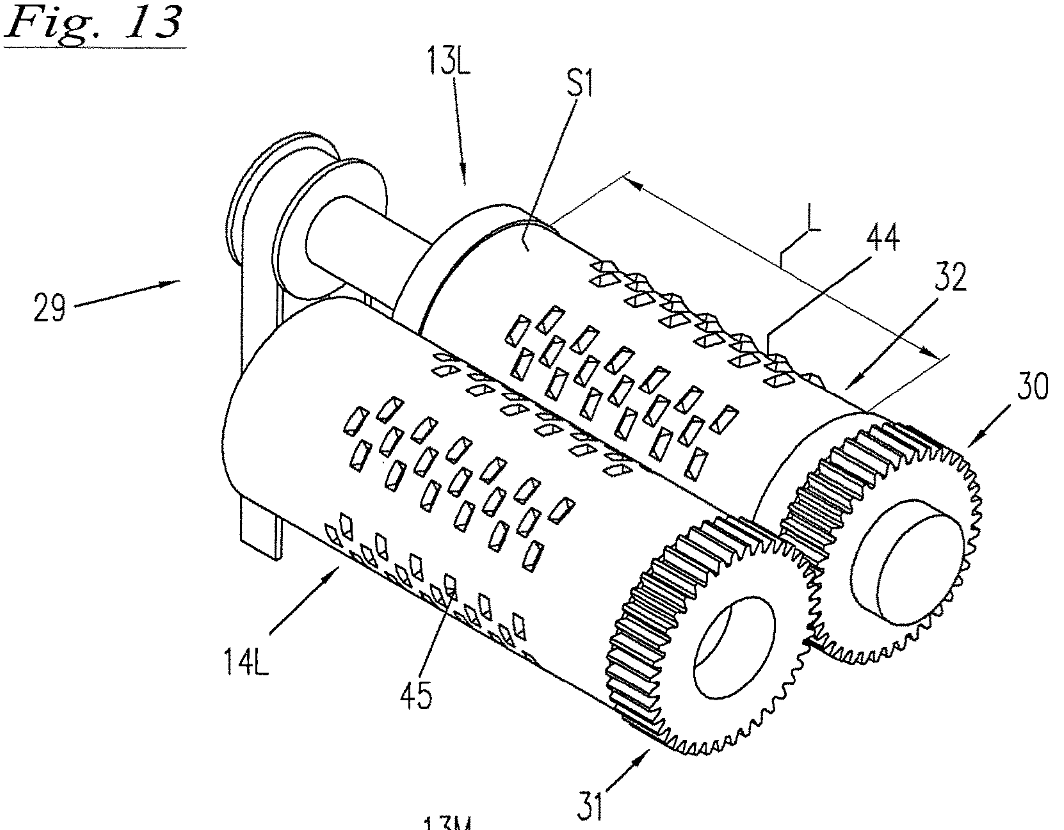

While the rectangles in the device according to FIG. 12 are oriented with their larger dimensions along the longitudinal axis, the rectangular teeth 44 and the associated depressions 45 according to FIG. 13 are aligned with their longer extent perpendicular to the longitudinal axis. The flanks both of the rectangular and of the square teeth can also be arranged at an angle to the longitudinal axis which, for example, can lie between 10° and 80°. The other parts of the two rolls 13L and 14L are the same as previously.

Figure 14:
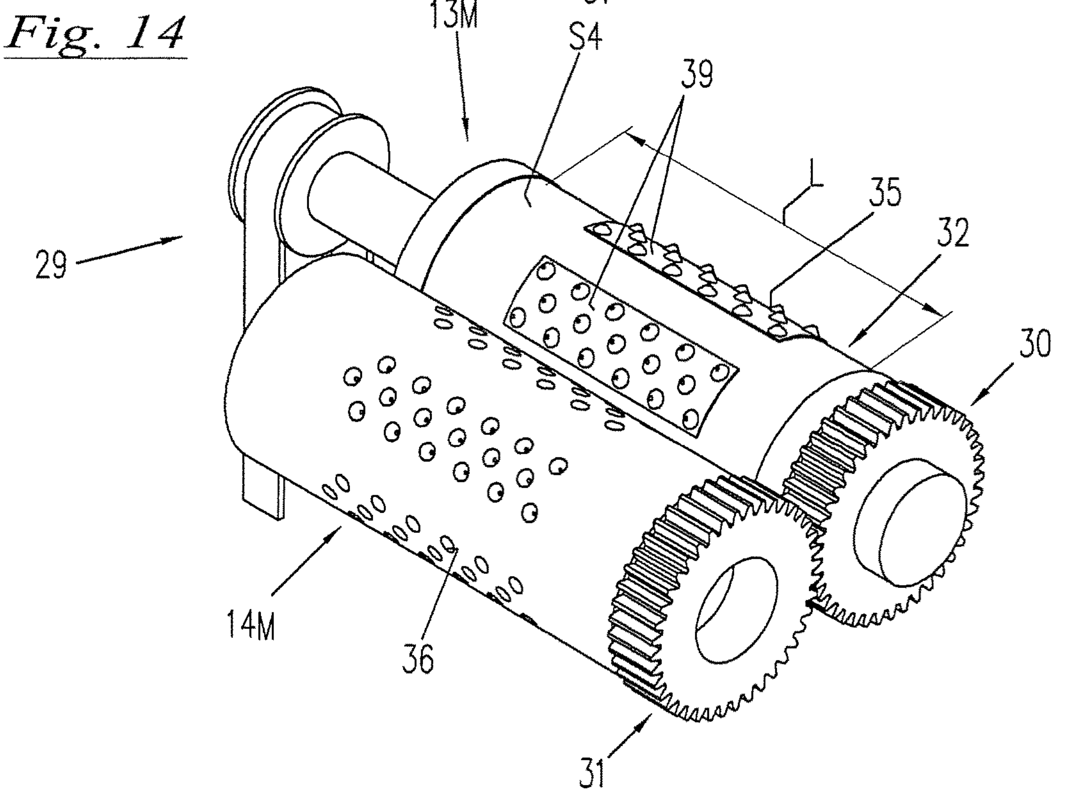

The pair of rolls 13M and 14M according to FIG. 14 differ from the pair of rolls 13F and 14F according to FIG. 8 in that the male embossing roll 13M has both the elevated zone 39 and a reduction S4.

Figure 15:
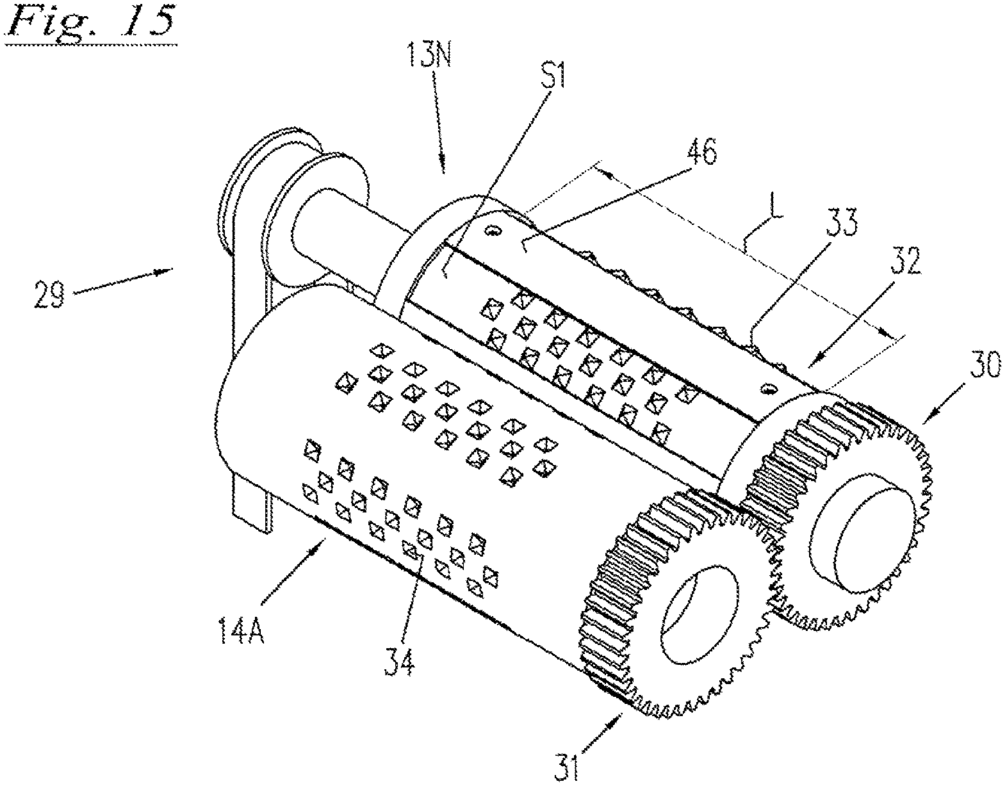
Figure 16:
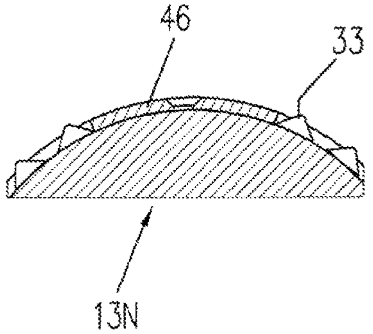

In the pair of rolls according to FIG. 15, the female embossing roll 14A is the same as in the pair according to FIG. 3, and the teeth 33 are also the same as on the male embossing roll 13A. However, between the rows of teeth the male embossing roll 13N has pressure strips 46 which have the object of tensioning the foil. The arrangement is illustrated clearly in section in FIG. 16.

Figure 17:
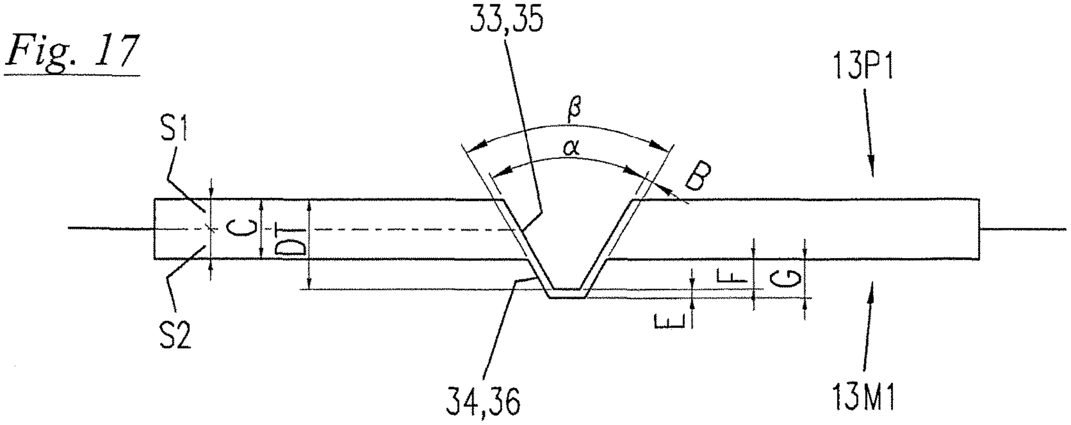
FIGS. 17-19 show, schematically and highly enlarged, possible arrangements of perforating teeth and associated depressions.

FIGS. 17 to 36 show, schematically and highly enlarged in a radial section, the cooperating structures of the male and female embossing rolls. This reveals that the depressions on the female embossing roll corresponding to the elevated structures of the male embossing roll are not strictly inversely congruent but can include deviations within a certain extent. In order to be able to characterize the dimensions and their deviations better, some angles and dimension information are shown in FIG. 17. The teeth can be teeth with a square or rectangular outline or conically tapering teeth or teeth having another, for example triangular, outline.

In FIG. 17, both rolls have reductions and, on the male embossing roll 13P1 there is shown a tooth 33 or 35, the opposite flanks of which enclose an angle α. The depression 34 or 36 in the female embossing roll 13M1 corresponds to the tooth 33 or 35, the opposite flanks of the depression enclosing an angle β, wherein α is smaller than β. The difference between the two angles is B, the tooth height is DT, a depth of the protrusion of tooth 33, 35 into depression 34, 36 is F, and the depth of the depression in the female die is G. The distance between the tooth surface and the base surface of the depression is E, the reduction of the circumference on the male and on the female embossing roll is S1 and S2, the overall reduction is C.

Exemplary dimensions are:

| | |
|---|---|
| tooth height | greater than 0.05 mm, typically 0.2 to 0.4 mm, |
| pitch | greater than 0.1 mm, typically 0.1 to 4 mm, |
| angle α β | 10° to 90°, |
| difference β − α | 0 to 80°, |
| reduction S in circumference | 0.02 to 2 mm, |

where the pitch is defined as the distance between two adjacent teeth.

These statements are exemplary, as described above, and not to be understood as limits. Depending on applications, larger, possibly also smaller, dimensions can also be chosen.

Figure 18:
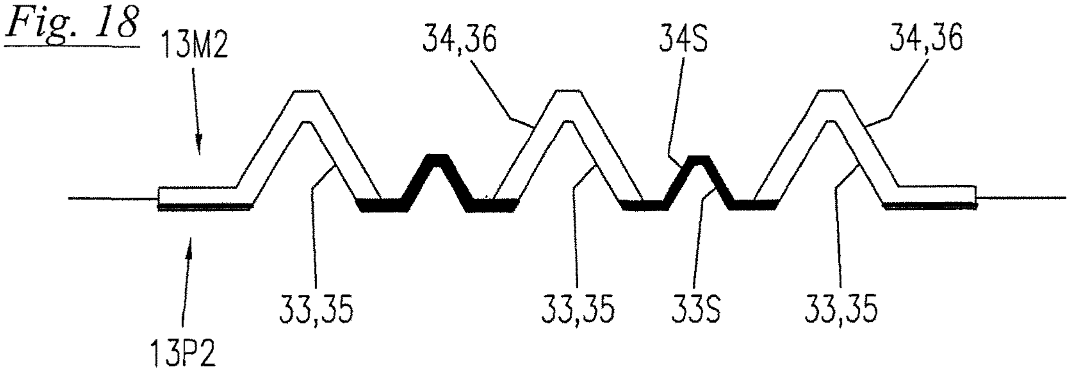
Figure 19:
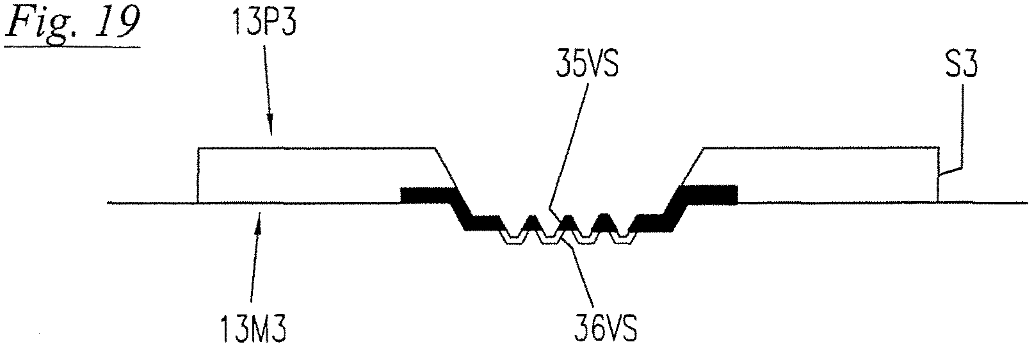
Figure 20A:
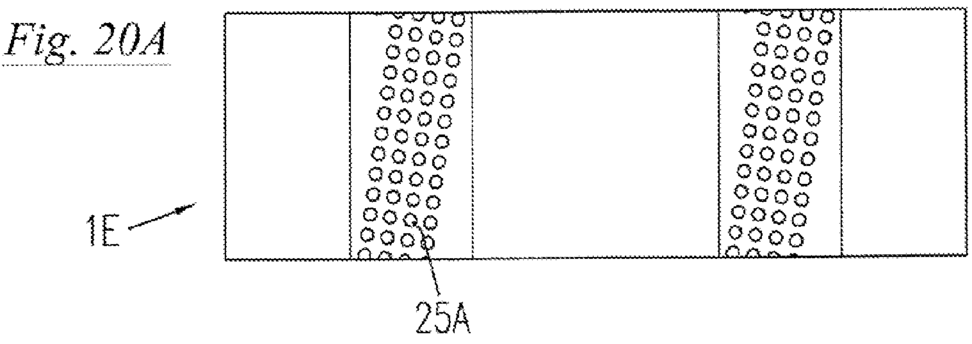
FIGS. 20A-20D show various hole patterns, produced with the embossing rolls 17-19.
Figure 20B:
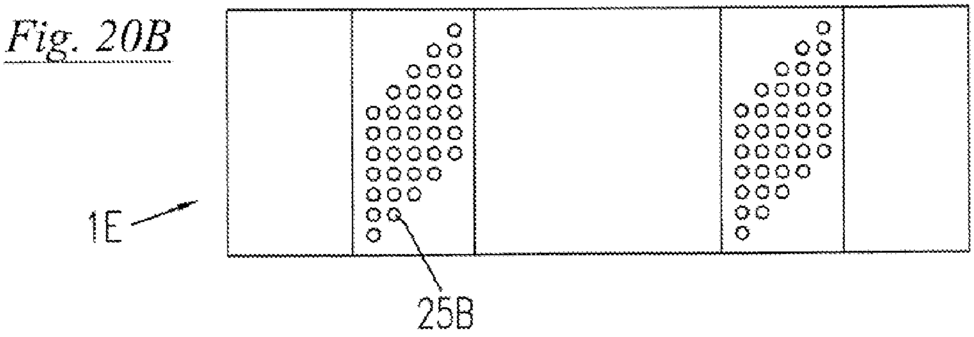
Figure 20C:
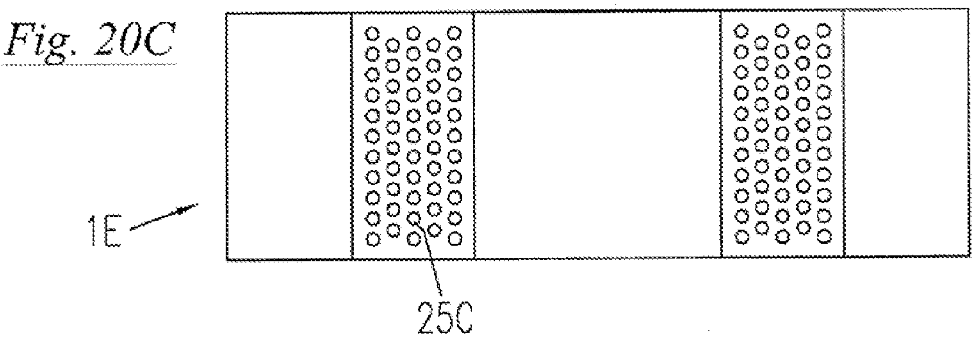
Figure 20D:
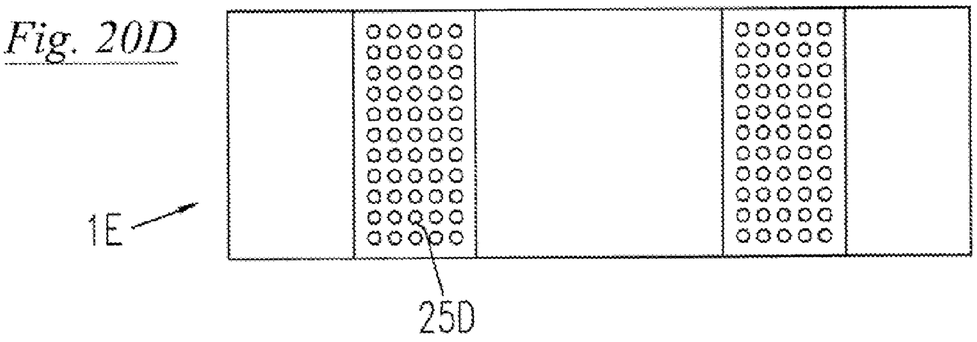

In FIGS. 18 and 19, the foil 1E following the embossing is illustrated highly schematically and enlarged, and it can be seen that the foil is compressed together somewhat at the edges where there are no perforating teeth or depressions, while the foil within the rows of teeth has the normal thickness of 20-50 micrometers. The tipping paper can have a somewhat greater thickness. In FIG. 18, the male die 13P2 is located at the bottom and female die 13M2 at the top. FIG. 18 illustrates a variant in which the foil has been perforated by the teeth 35, while the smaller teeth 33S and the corresponding smaller depression 34S only deform but do not perforate the foil. These deformations likewise serve improved ventilation, since there the foil does not make close contact and is more air-permeable. In the example of FIG. 18, too, both rolls each have a reduction S1, S2.

In the pair of rolls from FIG. 19, the male die 13P3 is located at the top and the female die 13M3 at the bottom. The male embossing roll 13P3 has a relatively large reduction S3, so that the foil outside the teeth is not pressed together. The teeth 35VS of the male die are relatively small as compared with the other teeth and, likewise, the associated depressions 36VS in the female die which are used for the deformation. As already stated, FIGS. 18 and 19 are highly schematic drawings.

In FIGS. 20A to 20D, 4 different possible examples of arrangements of rows of holes are indicated, the rows of holes 25A being arranged obliquely, the rows of holes 25B in the form of a rhombus, the rows of holes 25C perpendicular to the cigarette longitudinal axis but not having the same length, and the rows of holes 25D likewise being arranged perpendicular to the cigarette longitudinal mid-axis but having the same length. Between the rows of holes there are LIP zones.

In FIGS. 21 to 36, only one male die tooth and one female die depression each are illustrated in schematic form, wherein a male-female die pair is illustrated respectively alternately with the male die at the top and the female die at the bottom, or vice versa. Since the foil supplied is not homogenous but structured in the thickness and can possibly have a different surface in each case, a different structure can be produced in each case, depending on whether the male embossing roll is arranged at the top or at the bottom.

Figure 21:
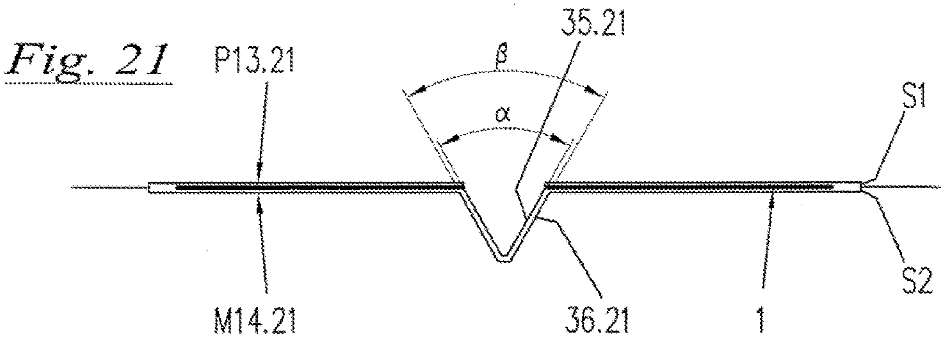
FIGS. 21-36 show, schematically and highly enlarged, variations of teeth and associated depressions and possible arrangements of the embossing roll pairs.
Figure 22:
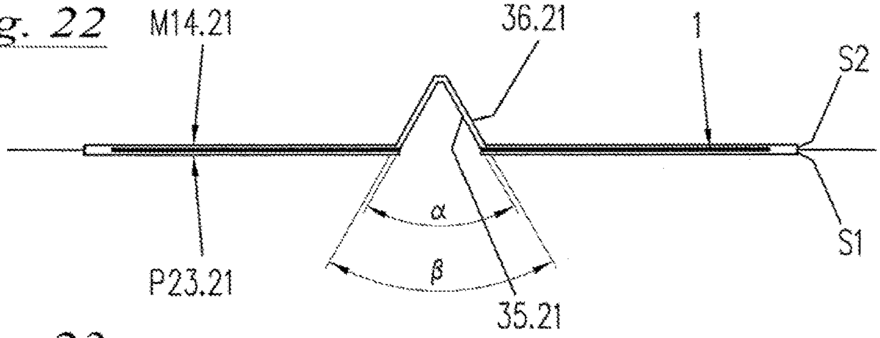

FIG. 21 shows a male-female die pair having a male die P13.21 and a female die M14.21. Both the tooth 35.21 and the depression 36.21 have an opening angle α, β which, in the present example, is 60°. Both rolls have a reduction S1, S2, so that regular embossing is possible. The arrow 1 points to the surface of the cigarette paper. In the present example, the sum of the two reductions is 0.02 mm. In FIG. 22, the male die P23.21 is arranged at the bottom and the female die M14.21 at the top, which means that the action of the male die tooth on the paper takes place inversely, that is to say from below.

Figure 23:
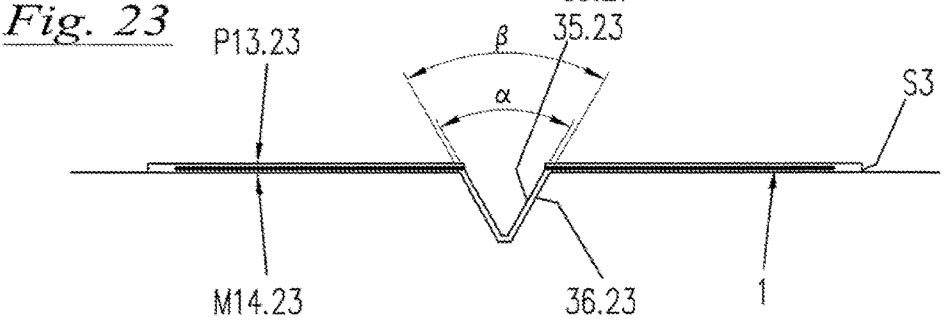
Figure 24:
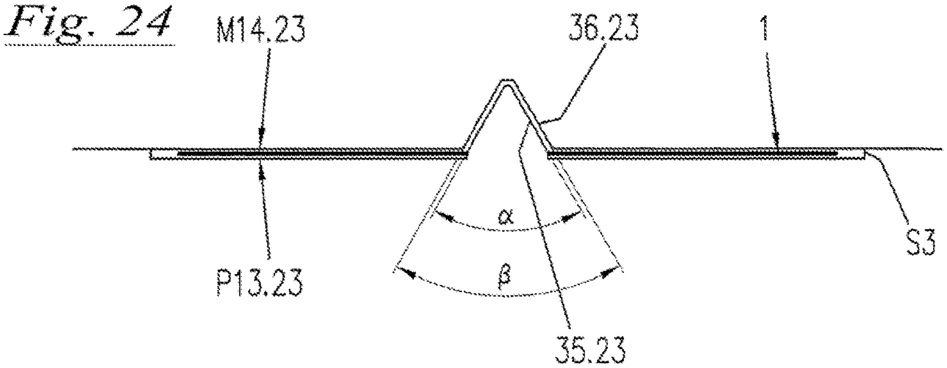
Figure 25:
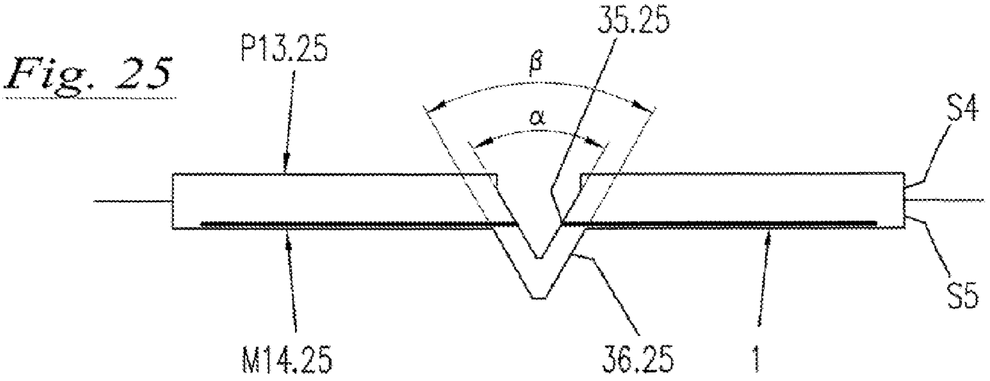
Figure 26:
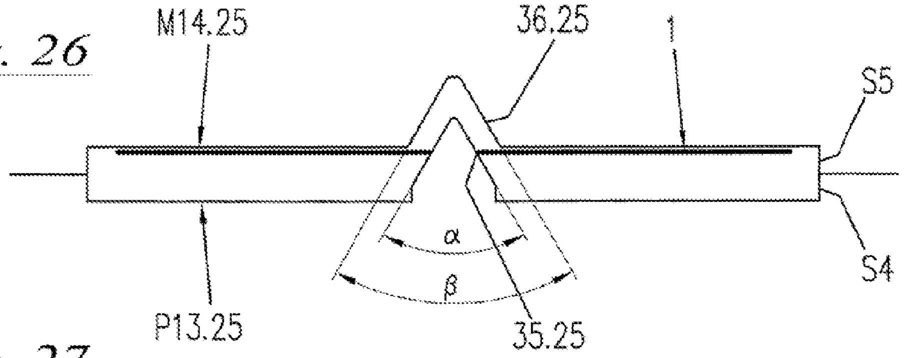
Figure 27:
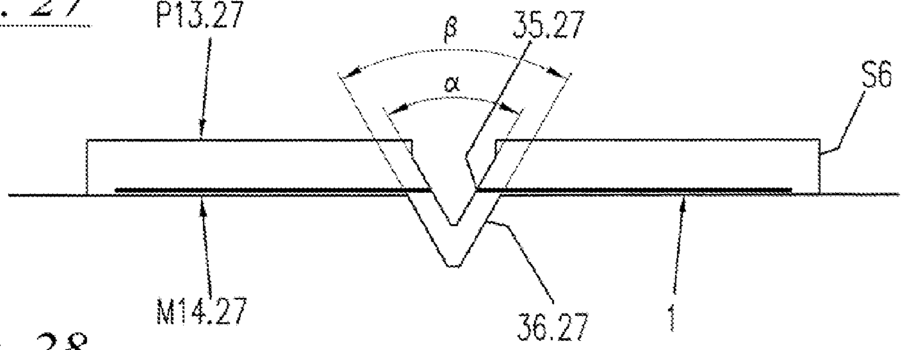
Figure 28:
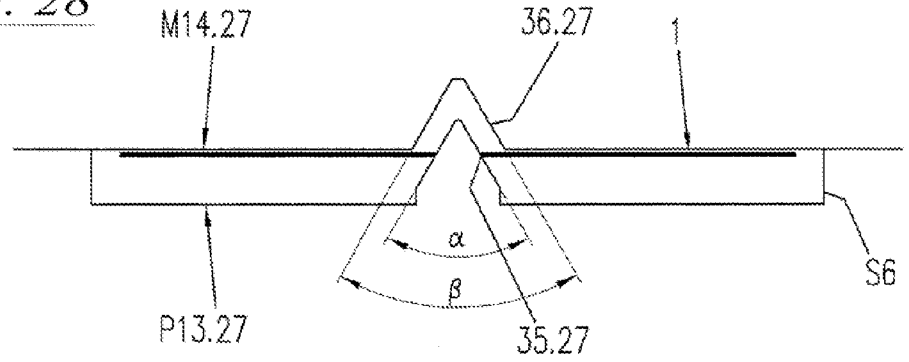

In the male-female die pair according to FIG. 23, the male die P13.23 and the female die M14.23 have the same tooth 35.21 and the same depression 36.21 as in the preceding example, but only the male die having a reduction of 0.02 mm here, while the female die is not reduced. In FIG. 24, the positions of male and female die are interchanged. In the embodiments according to FIGS. 21-24, the paper foil is in each case clamped in during the perforating operation.

In the exemplary embodiments according to FIGS. 25-28, the paper foil is not clamped in during the perforating operation. In this case, the sum of the reductions, distributed to both rolls or only to one roll, is 0.14 mm. The male die P13.25 has a tooth 35.25 and the corresponding female die M14.25 a depression 36.25, the opening angle α, β of which is likewise 60°. Because of the relatively large reduction, the hole diameter for the same teeth and depressions is less than in the preceding example. It can be seen that, given otherwise constant dimensions of the teeth, the hole diameter can be varied by using the size of the reduction. The difference between FIGS. 25 and 26 and FIGS. 27 and 28 lies in the fact that the reduction S4, S5 is made once on both rolls and, in the second example, the reduction S6 is made only on the male embossing roll P13.27 and not on the female embossing roll M14.27, the male embossing roll P13.27 having a tooth 35.27 and the corresponding female embossing roll M14.27 a depression 36.27.

Figure 29:
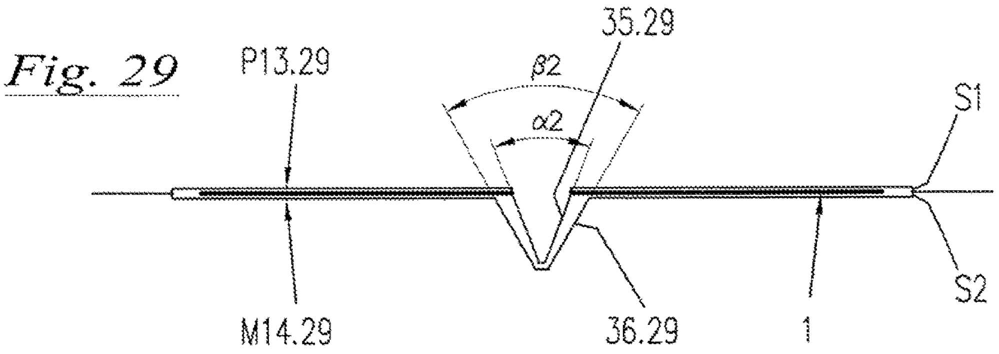
Figure 30:
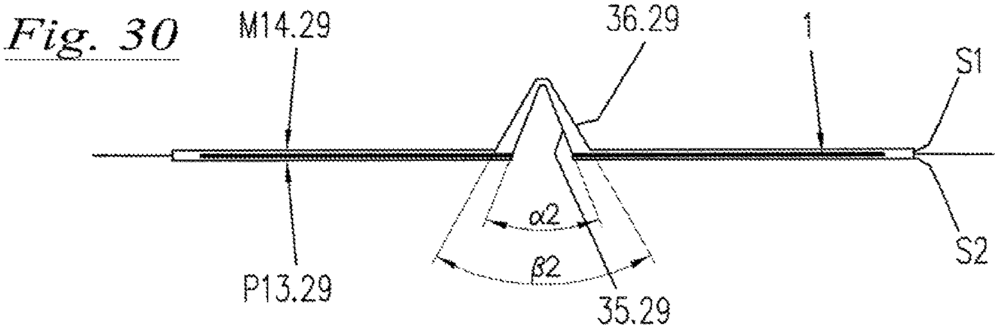
Figure 31:
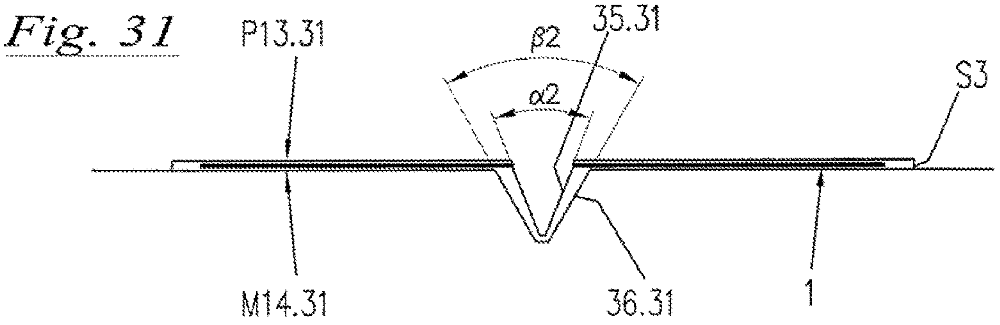
Figure 32:
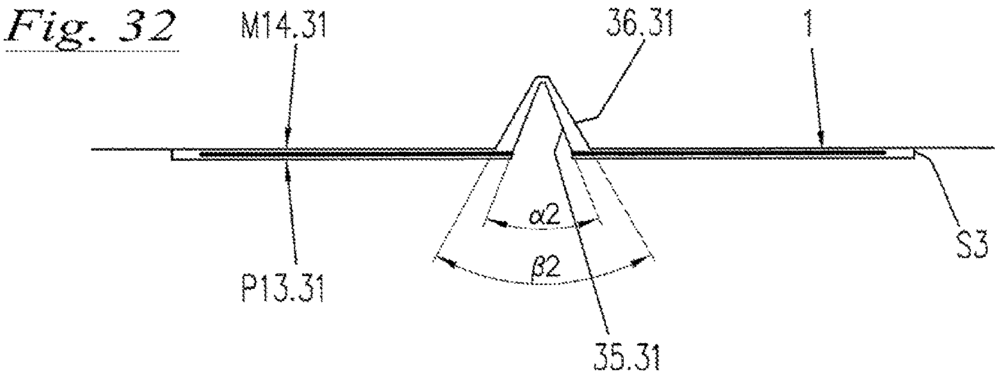
Figure 33:
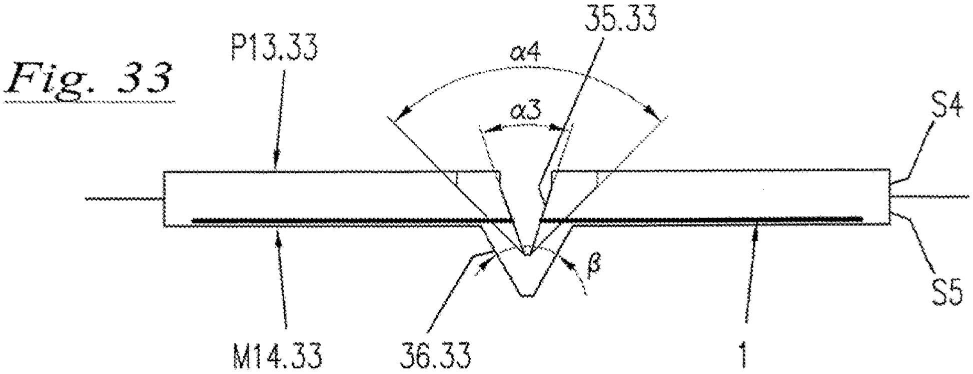
Figure 34:
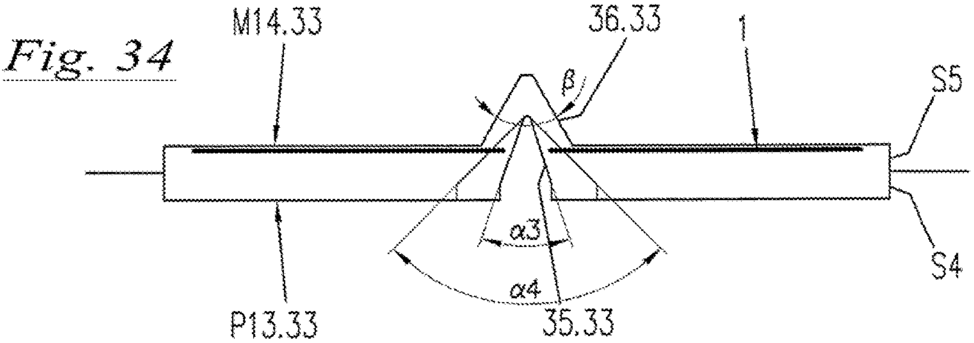
Figure 35:
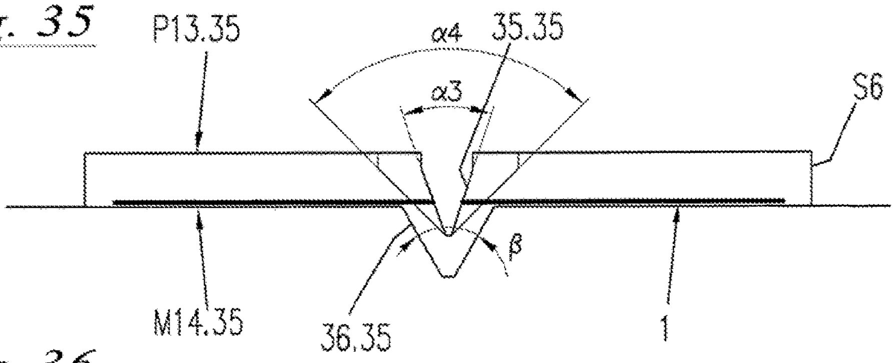
Figure 36:
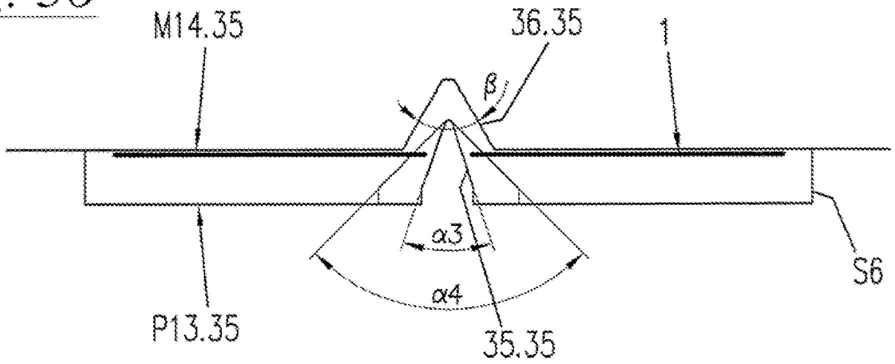

In the embodiments according to FIGS. 29-32, the paper is again clamped firmly, since the entire reduction, whether distributed to both rolls (S1, S2) or only to one roll (S3), is 0.02 mm. The male die P13.29 or P13.31 has teeth 35.29 or teeth 35.31, respectively, which enclose an angle $\alpha 2$ of 45°. The opening angle of the associated depression 36.29 or depression 36.31 on the female die M14.29 or M14.31, respectively, is $\beta 2=60°$. While the reductions S1, S2 in the embodiments according to FIGS. 29 and 30 are distributed to both rolls, in the embodiment according to FIGS. 31 and 32 only the male embossing roll P13.31 has a reduction S3, while the female embossing roll M14.31 has no reduction.

In the following exemplary embodiments according to FIGS. 33-36, which, in a way analogous to the exemplary embodiments according to FIGS. 25-28, have the relatively large reduction of 0.14 mm, the paper is not firmly clamped. In the exemplary embodiments according to FIGS. 33 and 34, the male die P13.33 has teeth 35.33, the flanks of which can cover an angle between $\alpha 3=40°$ and $\alpha 4=90°$, while the associated female die M14.33 has depressions 36.33 have the same opening angle $\beta$ of 60°. In these examples, too, in the examples according to FIGS. 33 and 34 the reductions S4, S5 are distributed to both rolls, while in the examples according to FIGS. 35 and 36 the reduction S6 is present only on the male embossing roll P13.35, but is not present of the female embossing roll M14.35. Moreover, in FIGS. 35 and 36, the male die P13.35 has teeth 35.35, the flanks of which can cover an angle between $\alpha 3=40°$ and $\alpha 4=90°$, while the associated female die M14.35 has depressions 36.35 have the same opening angle $\beta$ of 60°. The other dimensions are the same.

Because of the very complicated technology during the production of a male-female roll pair by means of mechanical tools or by using the etching technique, the application of these for industrial purposes is very restricted. In general, such systems are used for individual productions or for special purposes. In addition, a conventional male-female die system having inversely congruent structures has, amongst other things, the serious disadvantage that the foil exhibits distortion in the transverse direction, in particular following the embossing of row structures, which makes further processing in a maker very difficult.

On the basis of the above description, for a substantial improvement in the embossing possibilities and quality and, above all, also for use in the online method, it is primarily required that the surface structures of the rolls, in particular of the female embossing rolls, can be produced in a great variety and more logically and above ail more accurately. While, according to the prior art, the accuracy could be ensured by etching or by means of mechanical machining with high outlay, this is not true of the logical and consequently also quicker production of the male-female embossing rolls in a large variety of the perforating elements.

Furthermore, there is the requirement that measures be taken to reduce the transverse stresses in the embossed foil, which occur to a greater extent in the case of inversely congruent structures, in such a way that said stresses are no longer disruptive to the further processing.

One solution resides in forming the surface structures of the rolls of a set independently of one another, i.e. that it is not necessary for the male embossing roll to be shaped first and for the female embossing roll to be shaped physically dependently thereon. At present, this is conceivable for the required precision and production time, preferably when use is made of a suitable laser system which makes it possible to produce not only male embossing rolls but also female embossing rolls logically, accurately and above all in many shapes and independently of one another.

An exemplary laser system can contain a laser which contains a deflection unit having a beam splitter and acousto-optical or electro-optical modulators or polygonal mirrors. The deflection unit and a focusing optical unit and deflection mirrors form an engraving unit which can be displaced linearly in the X axis. However, provision can also be made to displace the entire laser device in the X axis. The rotating workpiece is driven by a drive. By means of the combination of the linear displacement of the engraving unit and the rotation of the workplace, a constant spiral is produced, which permits uniform machining.

The use of a deflection unit which, for example, can contain one or more beam splitters and electro-optical or acousto-optical modulators or one or more polygonal mirrors, permits the original laser beam to be split into two or more laser beams which are incident simultaneously on two or more tracks but have a spacing from each other such that they do not interfere with each other. In addition, the time interval between the impingement of the individual pulses can be chosen to be so large that thermal overloading does not take place.

As a result of the use of short-pulse lasers, the laser pulses of which lie between 10 femtoseconds and 100 picoseconds, the energy is applied in a very short time period, so that so-called "cold removal" is made possible, in which the material is evaporated very quickly without unacceptable heating of the adjacent material. The undesired liquid state of the material, which produces cratered rims and splashes, can be avoided thereby virtually completely. The desired structures are generated on a computer which controls the laser system, so that it does not matter whether a surface structure for a male embossing roll or for a female embossing roll is being produced. For the rolls or the surface thereof, a suitable steel, hard metal or ceramic, for example, is used.

Figure 37:
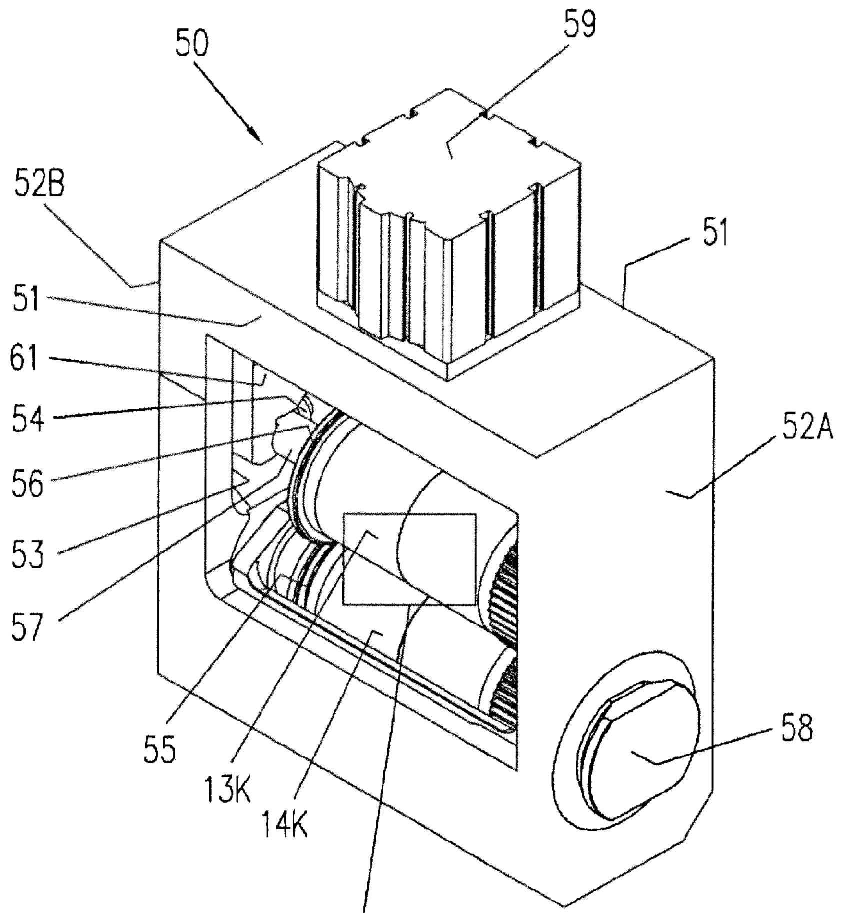
FIGS. 37 and 37A shows one embodiment of an embossing head having embossing rolls according to FIG. 37A.
Figure 37A:
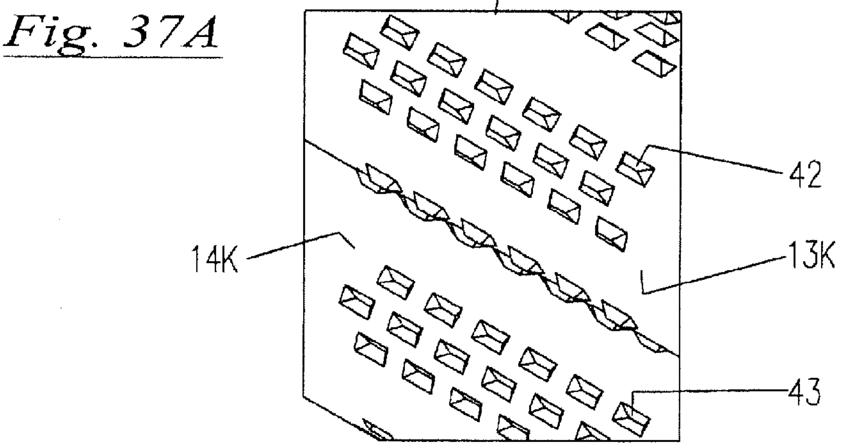
Figure 38:
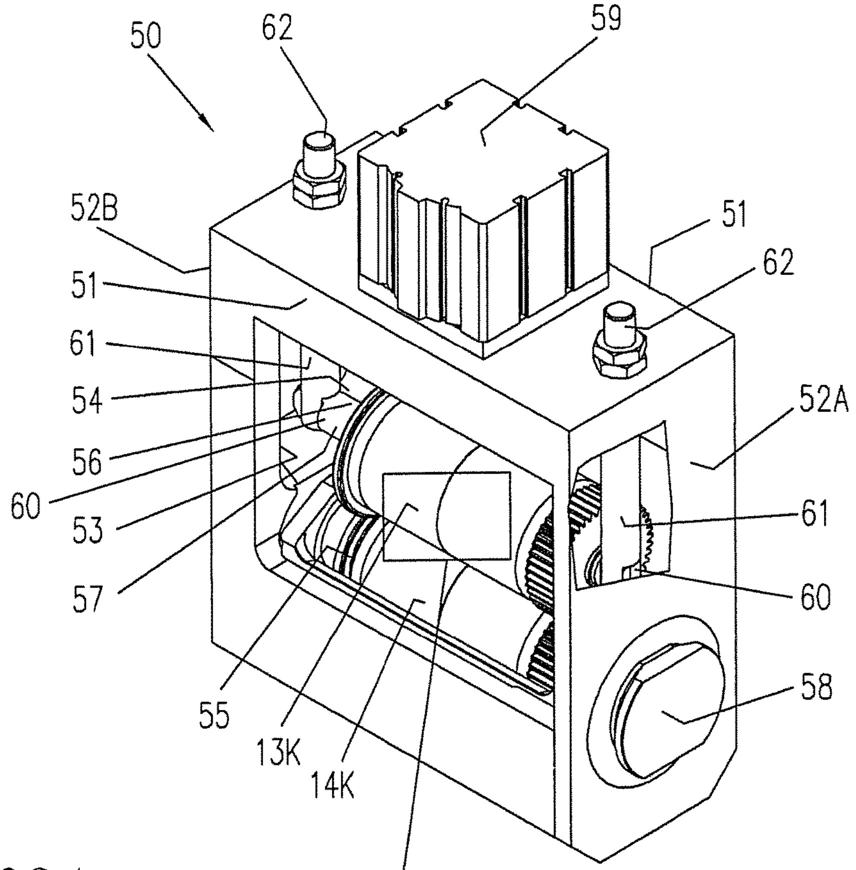
FIGS. 38 and 38A show a design variant relating to the embossing head according to FIGS. 37 and 37A.
Figure 38A:
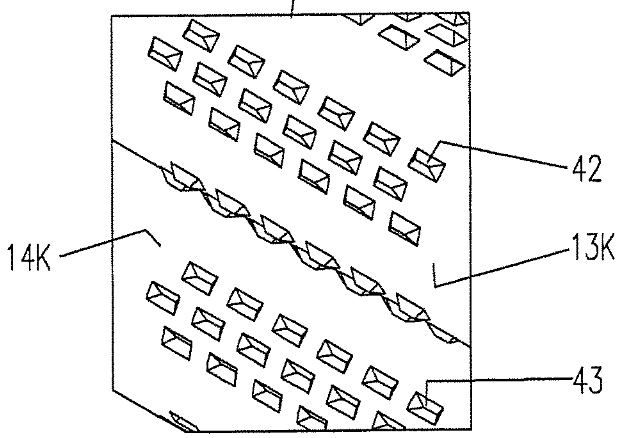

Two different housings for accommodating a pair of embossing rolls are illustrated in FIGS. 37 and 38. FIG. 37 illustrates a housing 50 in which the male embossing roll 13K and the female embossing roll 14K are accommodated. The male and female embossing rolls 13K and 14K have the teeth 42 and depressions 43 according to FIG. 12, as can be seen from FIG. 37A. In this example, both rolls exhibit a reduction. The housing 50 has two longitudinal sides 51 and two broad sides 52A and 52B, the longitudinal sides each having a window 53. The lower embossing roll, in the present case the female embossing roll 14K, is pushed in or out through an appropriate opening in the broad side 52A for the purpose of fixing and removal, and the axle end is rotatably mounted in the other broad side 52B. Mounting by means of needle and ball bearings is known per se.

The male embossing roll 13 is pushed in from window 53 and fixed in an accurate position. In FIG. 37, this type of fixing is illustrated symbolically by a screw 54. Since this is a male-female roll pair, the teeth and depressions of which are assigned to one another, the two rolls must be mounted in the housing in a very accurate relationship to each other.

One of the adjusting means in the direction of the longitudinal axis of the rolls consists in two very accurately machined adjusting rings 55 being produced on one of the rolls, the female embossing roll here, and an exact central ring 56, which comes to lie between the two rings 55, being produced on the opposing roll. Therefore, a very accurate alignment of the two rolls in the longitudinal direction can be achieved. One possible adjustment in the radial direction consists in the accurate production of the gear wheels 31 and 32, which permit very accurate radial positioning.

Located on the housing is a pneumatic block 59, which is controlled so as to set the pressure and, derived therefrom, the distance between the two rolls accurately. The non-driven roll—here the upper roll—is mounted on its axles in such a way that it is possible for the axles to give way in all three coordinates. As a result, the accurate synchronization of the teeth and depressions becomes possible. Furthermore, the connecting flange 58 of the axle of the lower roll, at which the lower roll is driven, can be seen in the drawing.

In the design variant according to FIG. 38, the housing, the embossing rolls and the pneumatic block are the same, and also the mounting of the lower roll, the female embossing roll, is the same. The difference between the two design variants resides in the mounting of the upper, here the male embossing roll 13, this mounting being illustrated very schematically. The two ends of the axle 57 of the upper roll 13 are pushed into appropriate recesses 60 of two holders 61, from the rear in the drawing, and are fixed. The holders can be displaced in their length, in order to set the distance of the two rolls from each other. This is indicated symbolically by the setting screws 62. Here, too, the upper roll can be mounted in such a way that the shaft thereof can be moved in the three dimensions. As already indicated, the two rolls can be interchanged, i.e. the male embossing roll at the bottom and driven and the female embossing roll at the top. This interchanging of the position of the rolls also corresponds to the illustrations of FIGS. 21-36.

The invention claimed is:

1. A device for embossing and perforating foils for tobacco goods, comprising:

a perforating apparatus including a pair of embossing rolls, one of the embossing rolls is a male embossing roll having teeth for perforating the foil, an opposing roll to the male embossing roll is a female embossing roll, which has depressions assigned to the male embossing roll, the perforating apparatus configured to operate online directly or indirectly in a production machine;

a first control unit configured to control a precise location, a size and an arrangement of perforations of the perforating apparatus as a function of a character of a foil to be processed; and a sensor for detecting the character of the foil, the sensor configured to signal to the first control unit to detect and to define a position of LIP (Low Ignition Propensity) zones, embossed patterns, or printed patterns, to control the perforating apparatus in such a way that the perforations are made at desired points with respect to the LIP zones, embossed patterns, or printed patterns, by adjusting an operating cycle of the perforating apparatus.

2. The device as claimed in claim 1, further comprising:

a second control unit having a positioning apparatus for setting a circumferential relative position of the pair of embossing rolls relative to the foil, the pair of embossing rolls having synchronization markings.

3. The device as claimed in claim 1, wherein an embossing unit which has at least two embossing rolls is arranged upstream of the perforating apparatus.

4. The device as claimed in claim 3, wherein the first control unit has a comparison apparatus for detecting a quantitative deviation between an operating cycle of the embossing unit and the operating cycle of the perforating apparatus.

5. The device as claimed in claim 1, further comprising:

a quality checker connected downstream of the perforating apparatus, configured to check a hole pattern on the perforated foil, to compare the hole pattern with a template and to control the perforating apparatus.

6. The device as claimed in claim 5, wherein the quality checker has a correlation detector, which is designed to compare images of the hole pattern with an associated template and to lead result to an evaluation unit, which is connected to the first control unit.

7. The device as claimed in claim 1, wherein the perforating teeth of the male embossing roll taper to a point and have a square, rectangular, triangular or round cross section, and depressions associated to the perforating teeth of the female embossing roll are shaped in a corresponding way the teeth and depressions configured to be arranged longitudinally or transversely or at an angle to a longitudinal axis of the embossing rolls.

8. The device as claimed in claim 7, wherein at least one of shapes and opening angles of the depressions correspond to at least one of the shapes and flank angles of the teeth.

9. The device as claimed in claim 8, wherein at least one of shapes and opening angles of the depressions are different from at least one of shapes and flank angles of the teeth.

10. The device as claimed in claim 1, wherein the geometric dimensions of the teeth and of the associated depressions are different from one another.

11. The device as claimed in claim 1, wherein the embossing rolls have synchronization means, and one of the embossing rolls has two adjusting rings and an other embossing roll has an adjusting ring coming to lie therebetween in order to determine an axial position of the pair of embossing rolls.

12. The device as claimed in claim 1, wherein at least one roll of the pair of embossing rolls has a reduced circumference over a length which is somewhat greater than a width of the foil.

13. The device as claimed in claim 1, wherein a surface of the embossing rolls having structures is produced by a femtosecond or picosecond laser system.

14. The device as claimed in claim 1, wherein the pair of embossing rolls are arranged in a housing configured to be replaced individually and independently of one another, a driven embossing rolls being pushed in through an opening in a transverse wall of the housing, and another embossing roll being pushed in through an opening in a longitudinal wall.

15. The device as claimed in claim 1, further comprising a buffer unit and an embossing unit arranged upstream of the perforating apparatus, and wherein the adjusting of the operating cycle of the perforating apparatus includes a lengthening and a shortening of a transport path of the foil between the embossing unit and the perforating apparatus, to adjust the operating cycle to the processing cycle of the embossing unit.

16. The device as claimed in claim 1, wherein the perforating teeth of the male embossing roll taper to a point and have a rectangular cross section, and depressions associated to the perforating teeth of the female embossing roll are shaped in a corresponding way, the rectangular teeth and depressions configured to be arranged longitudinally or transversely or at an angle to a longitudinal axis of the embossing rolls.

* * * * *